April 11, 1950
H. C. ELLIS
2,504,013
CLOTHES-WASHING MACHINE AND AUTOMATIC FLUID
OPERATED CONTROL DEVICE THEREFOR
Filed Dec. 1, 1944
14 Sheets-Sheet 4
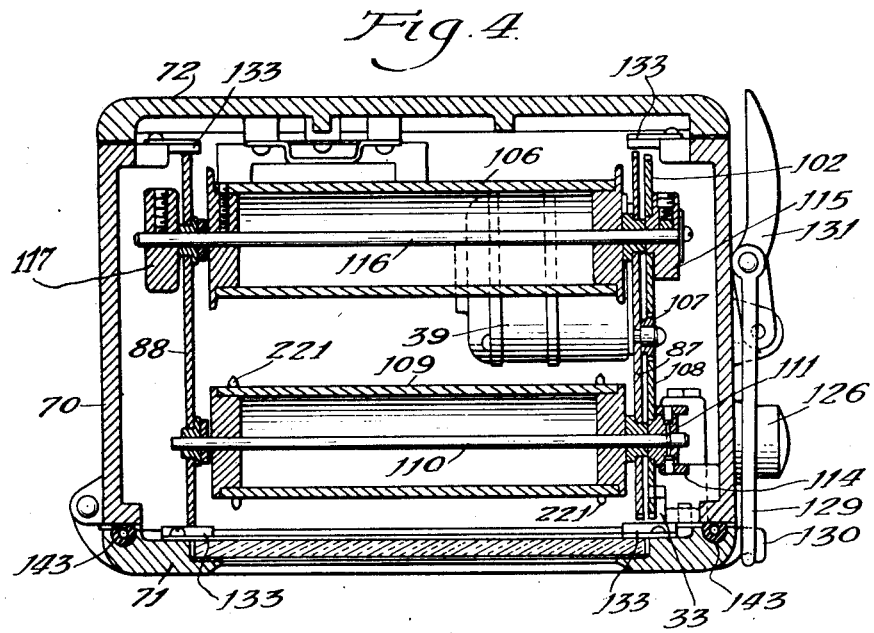
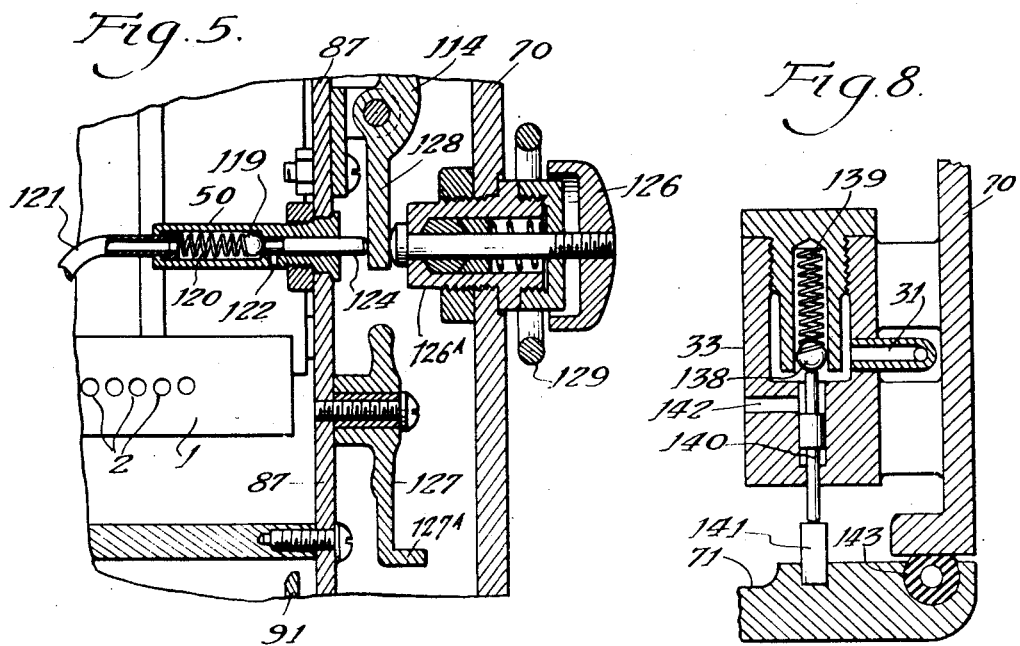
Inventor:
Hubert C. Ellis
By Harold Olsen
Attorney April 11, 1950     H. C. ELLIS     2,504,013
CLOTHES-WASHING MACHINE AND AUTOMATIC FLUID
OPERATED CONTROL DEVICE THEREFOR
Filed Dec. 1, 1944     14 Sheets-Sheet 5
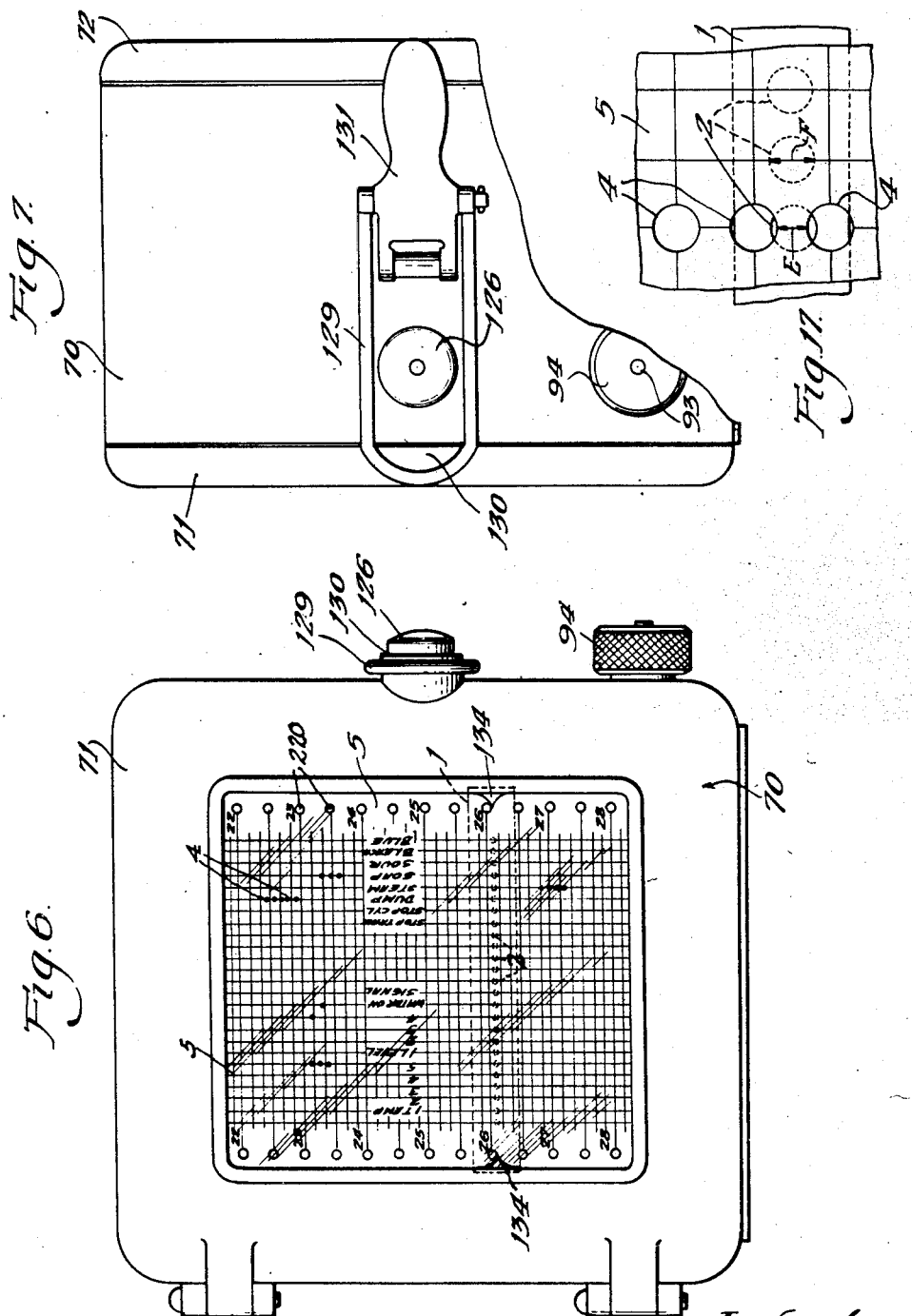
Inventor:
Hubert C. Ellis
By: Harold Olsen
Attorney.

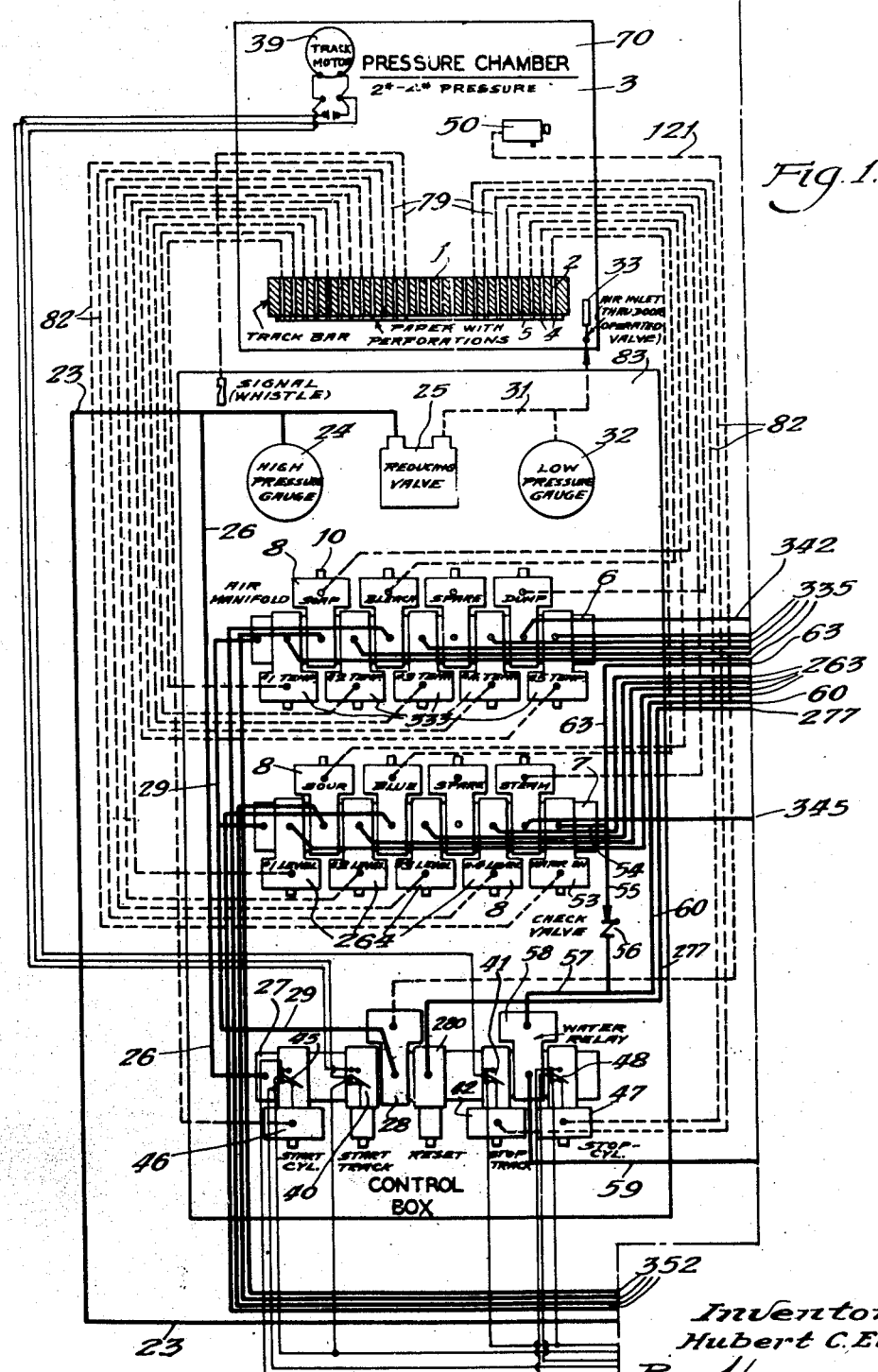

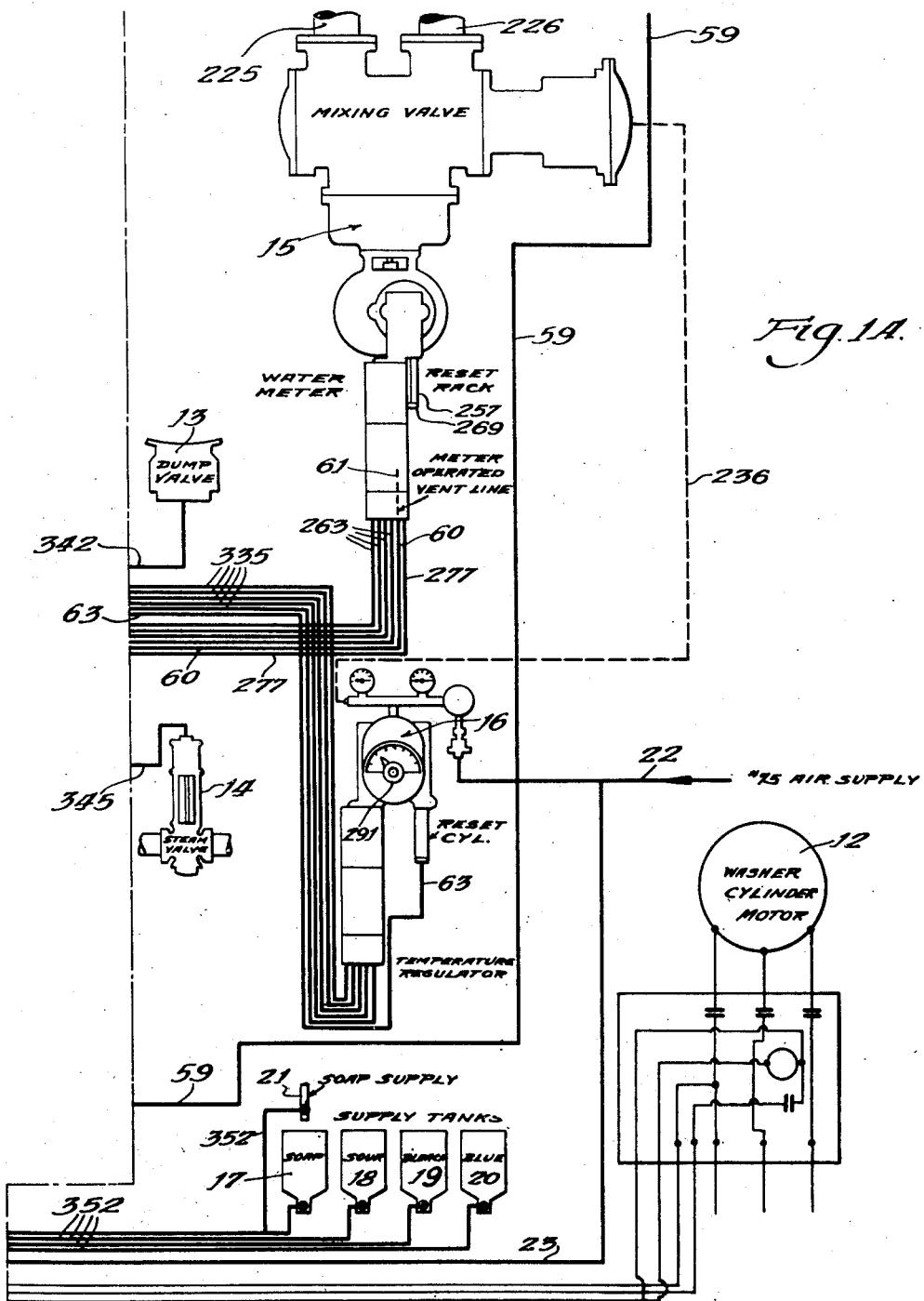

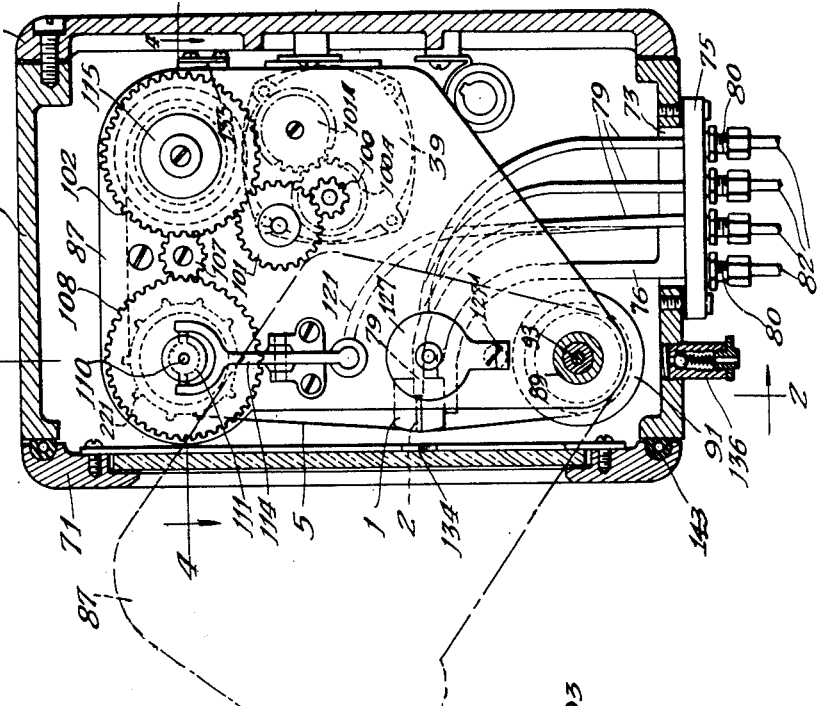

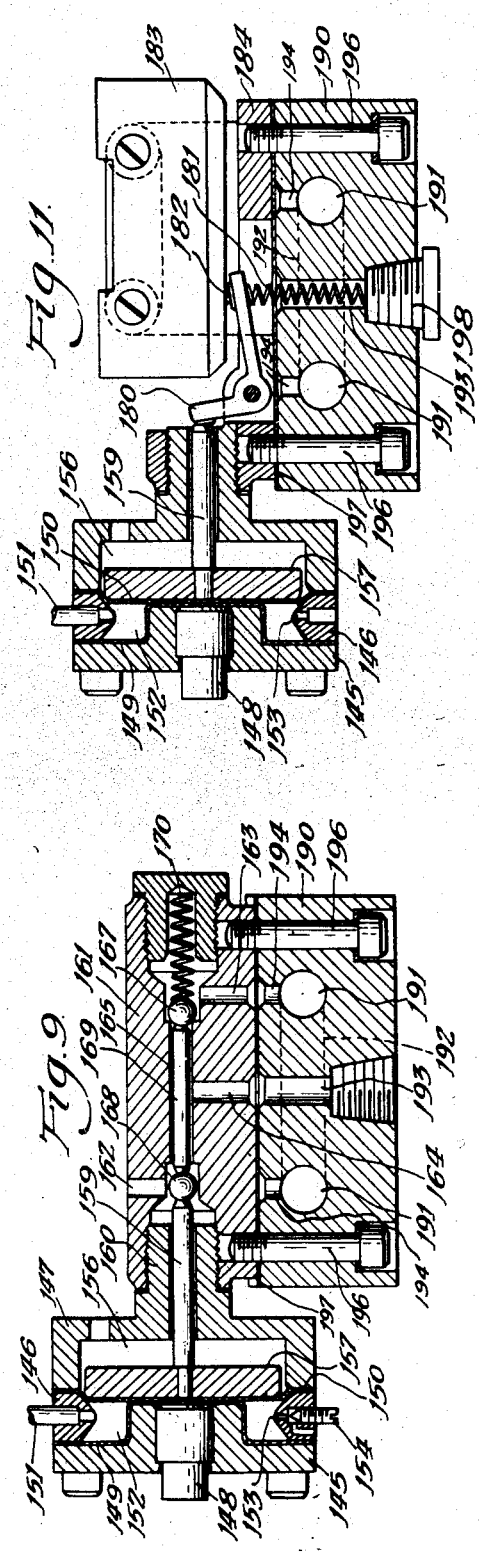
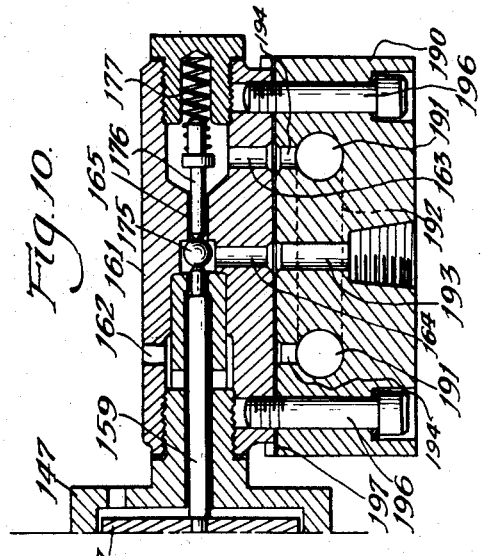
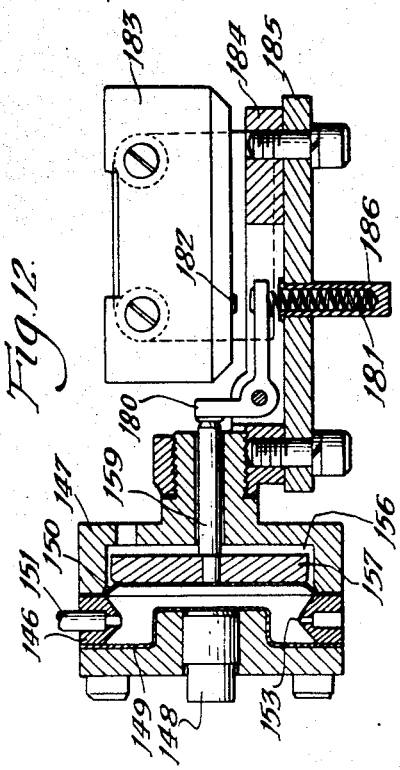

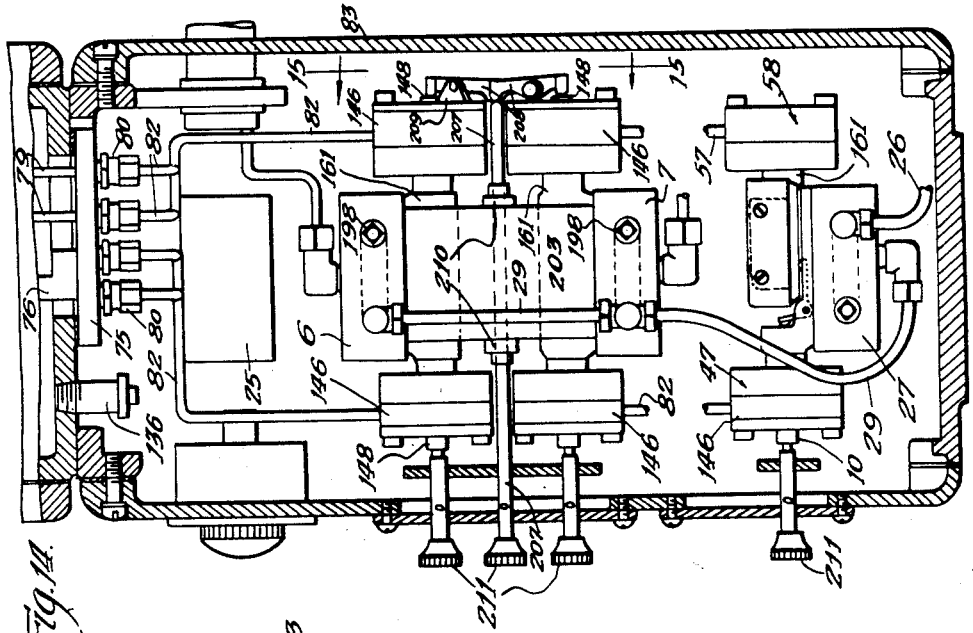
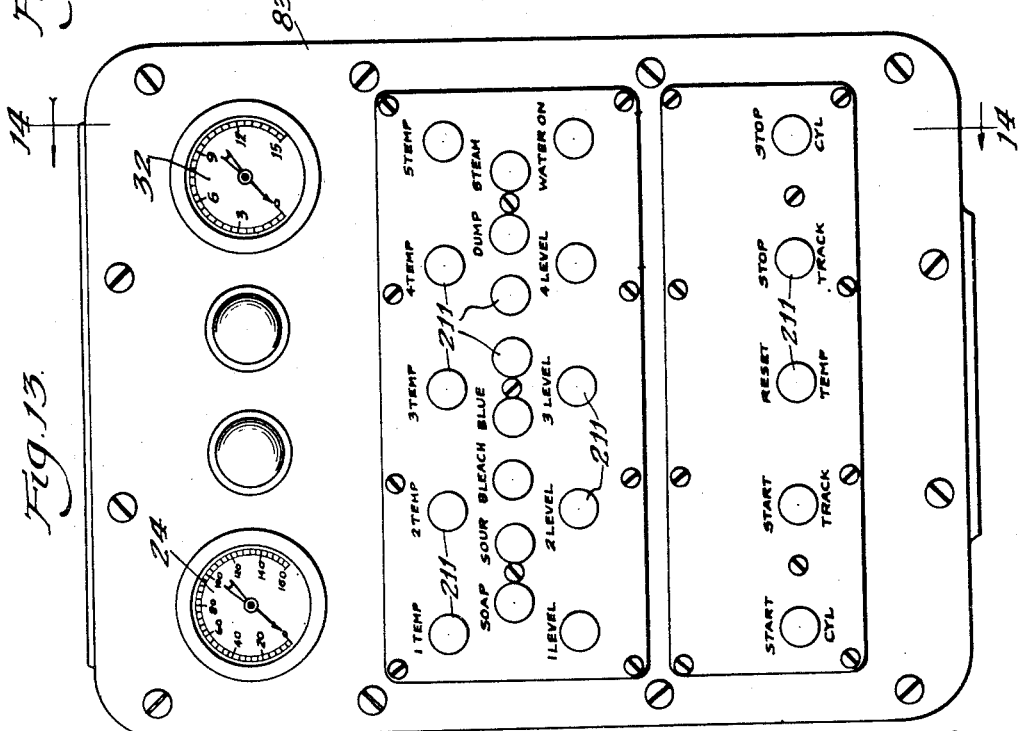

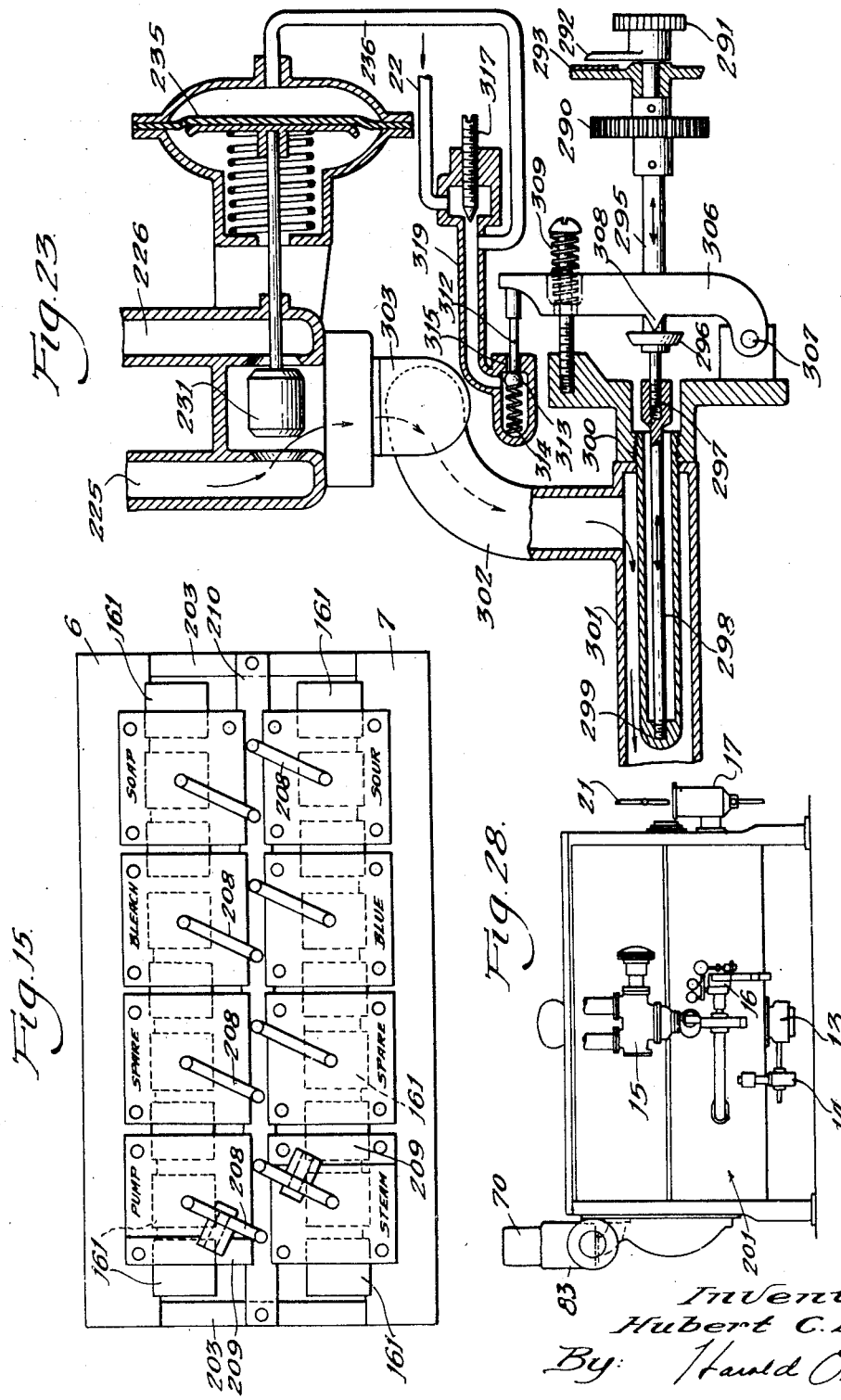

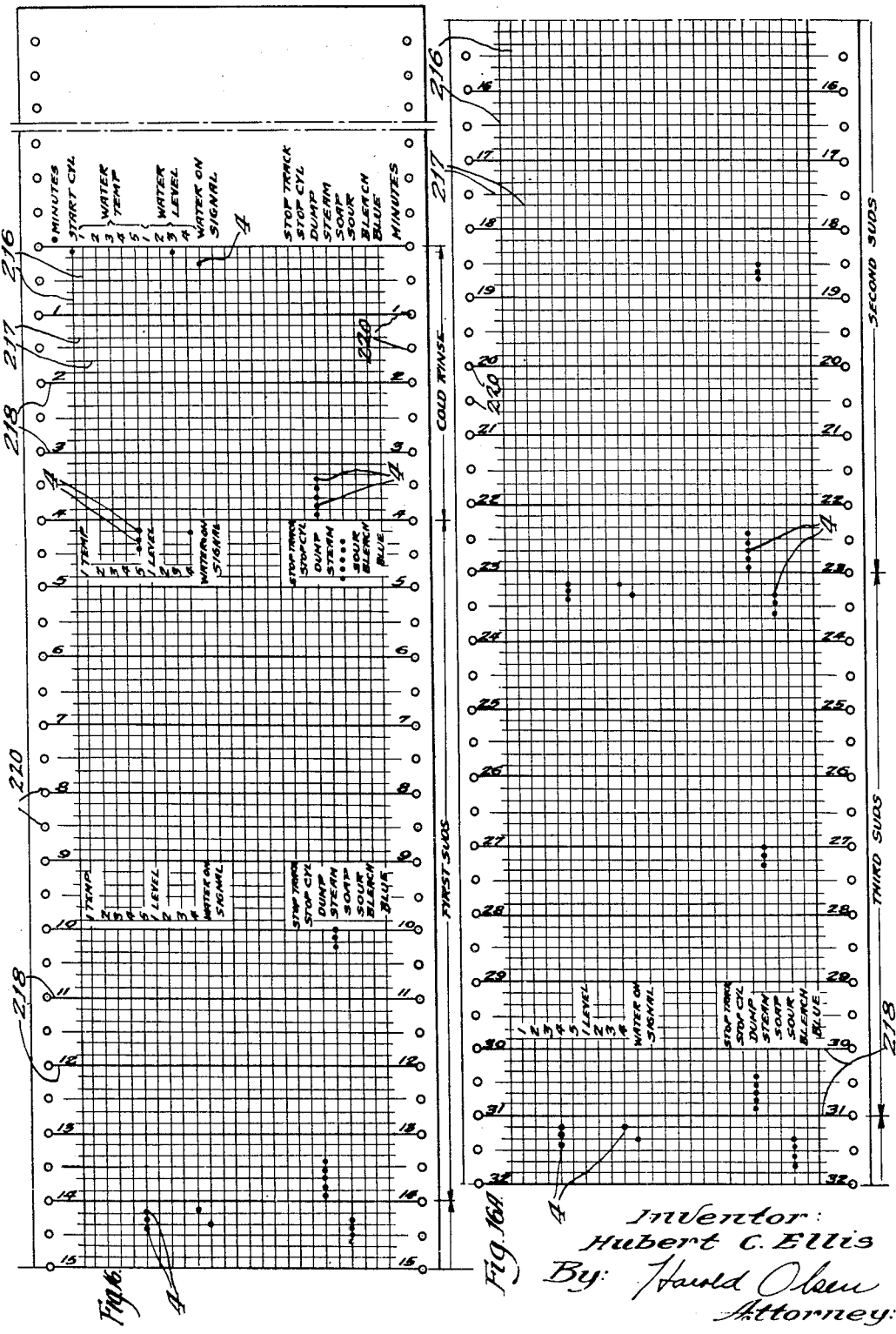

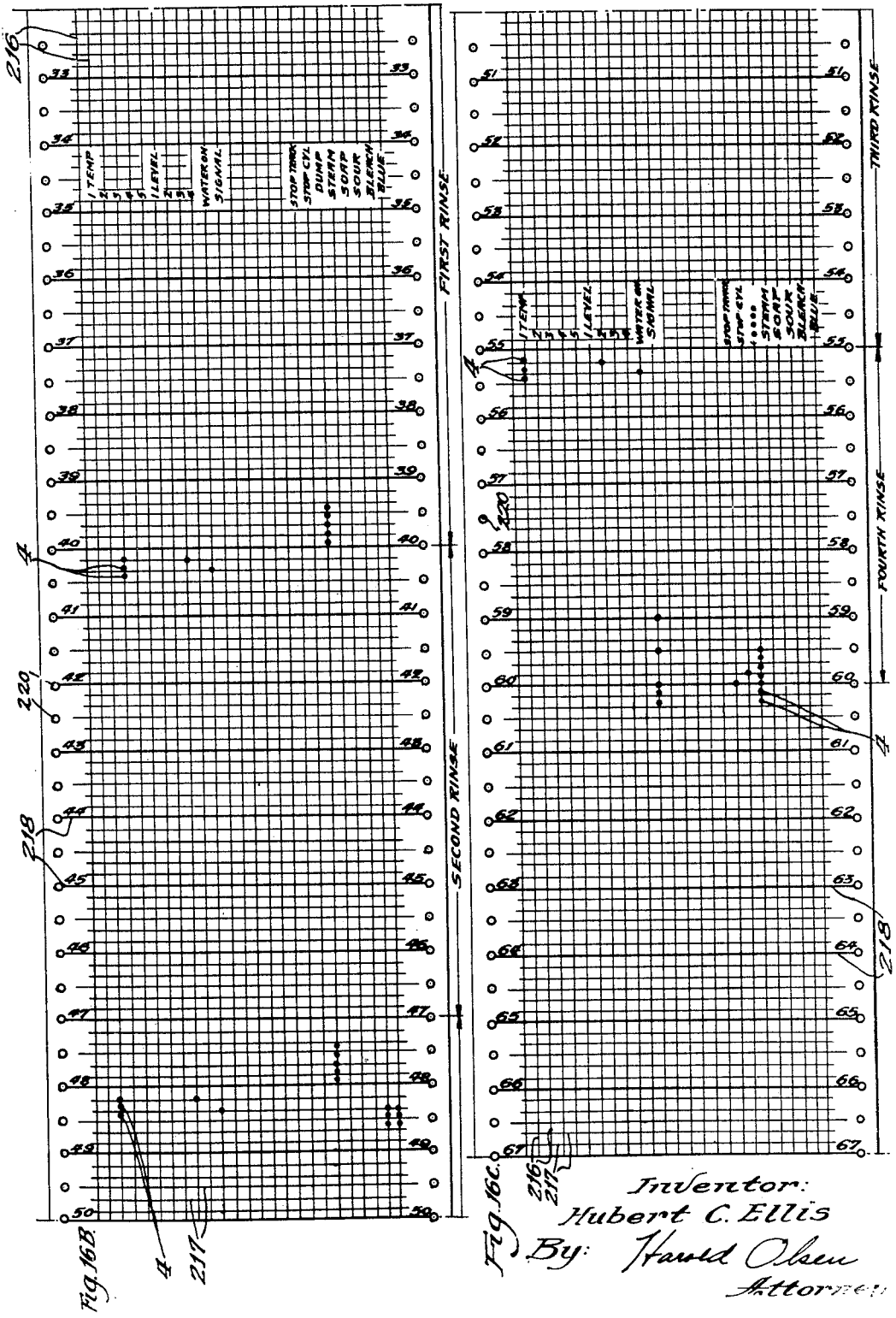

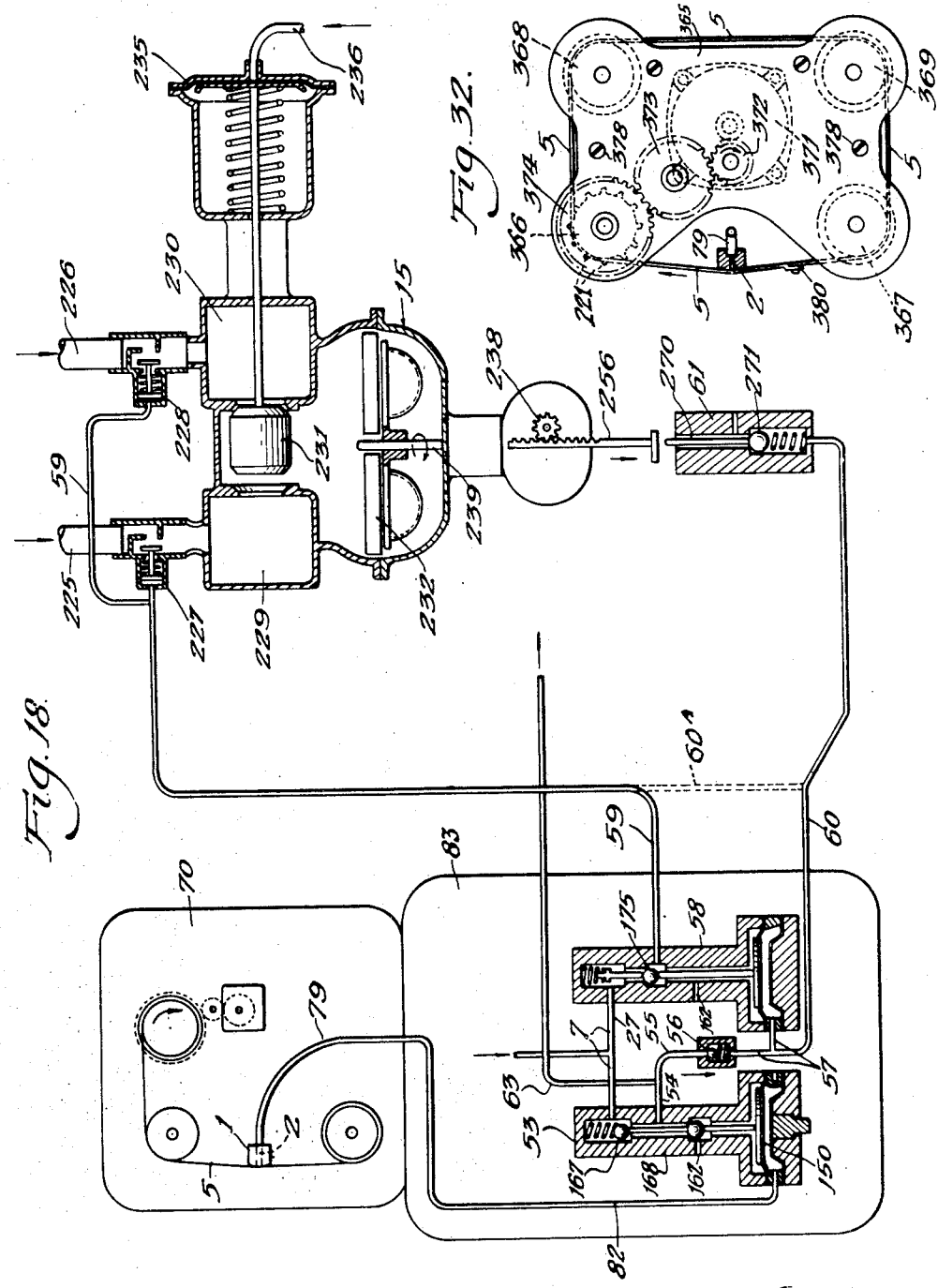

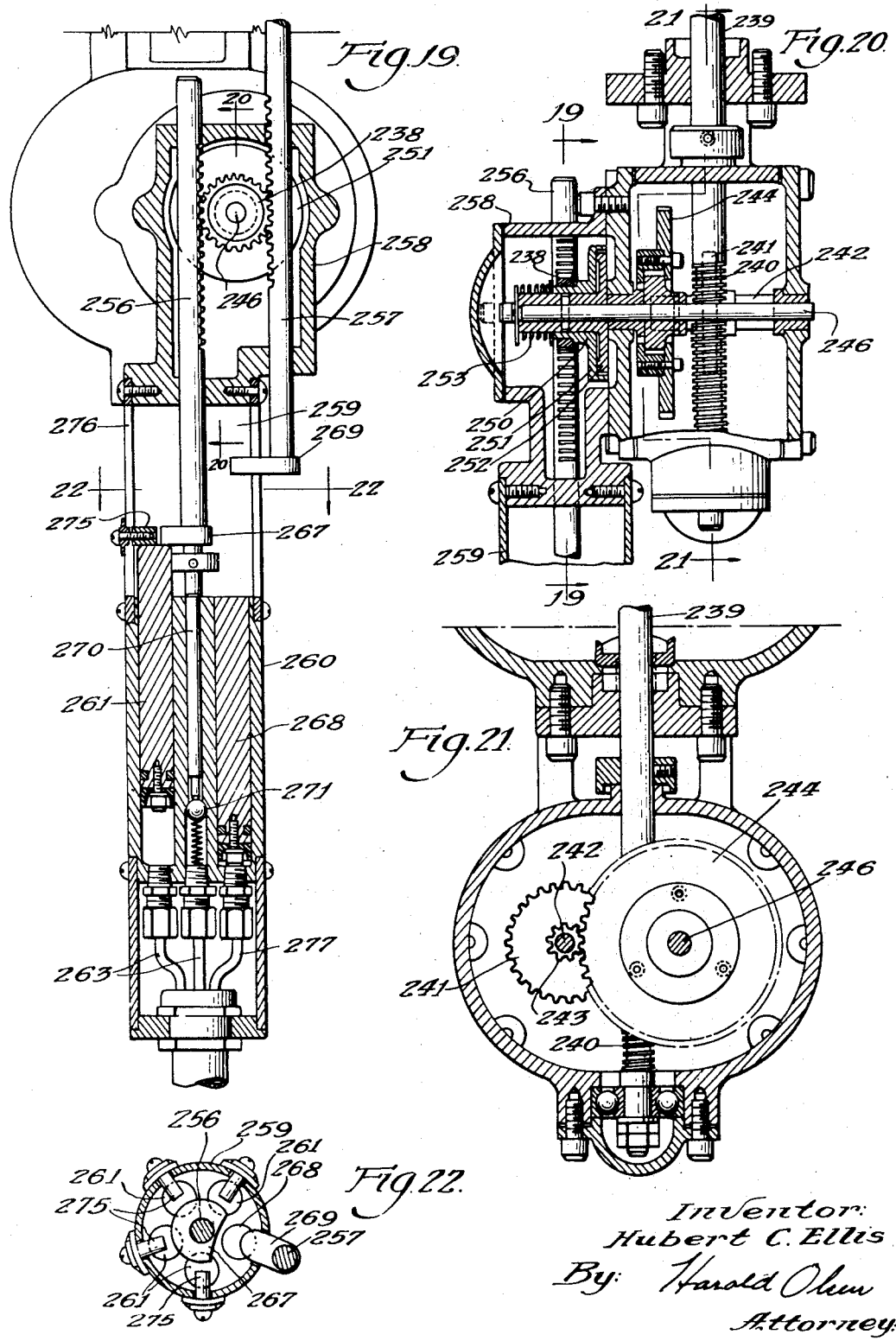

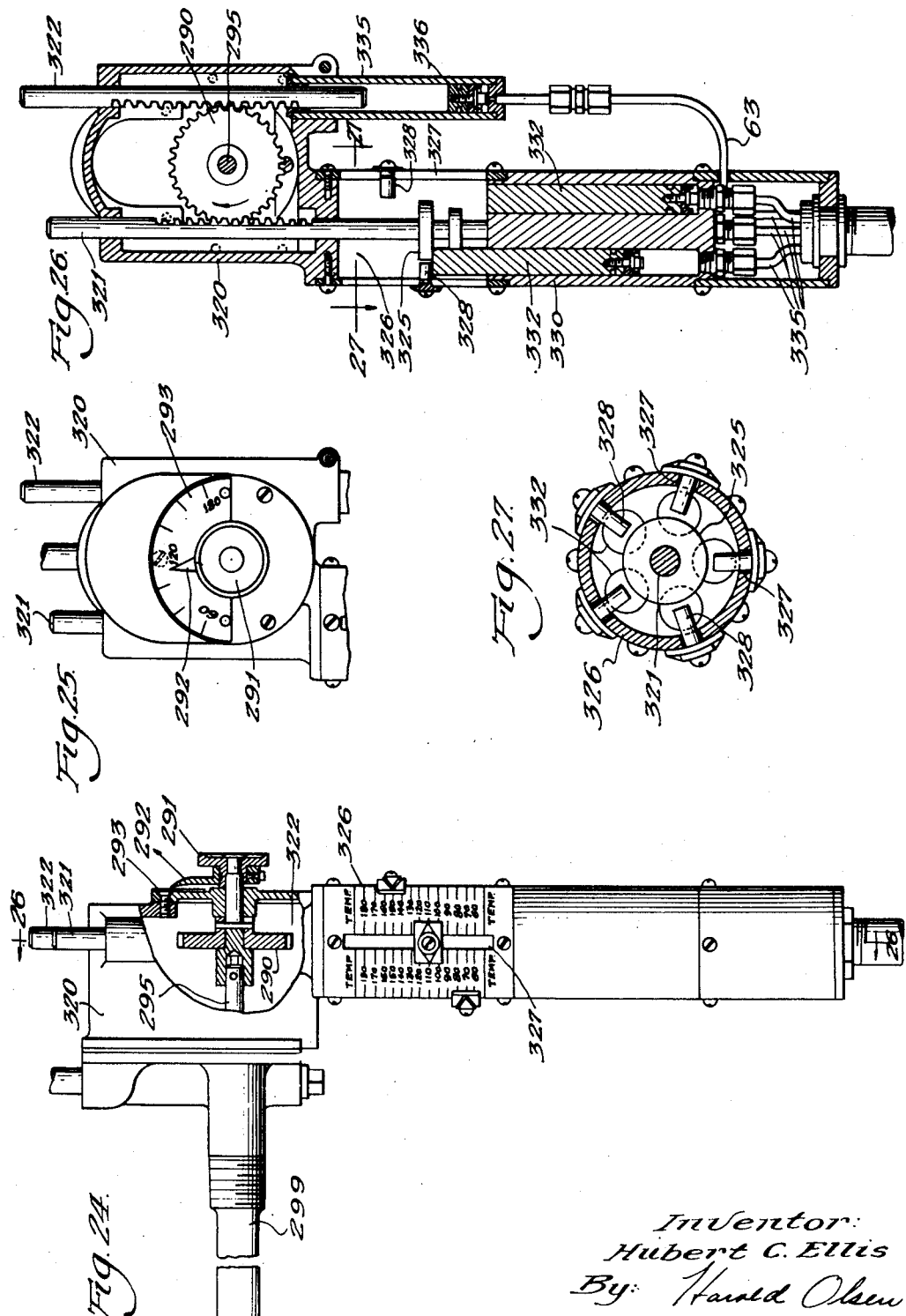

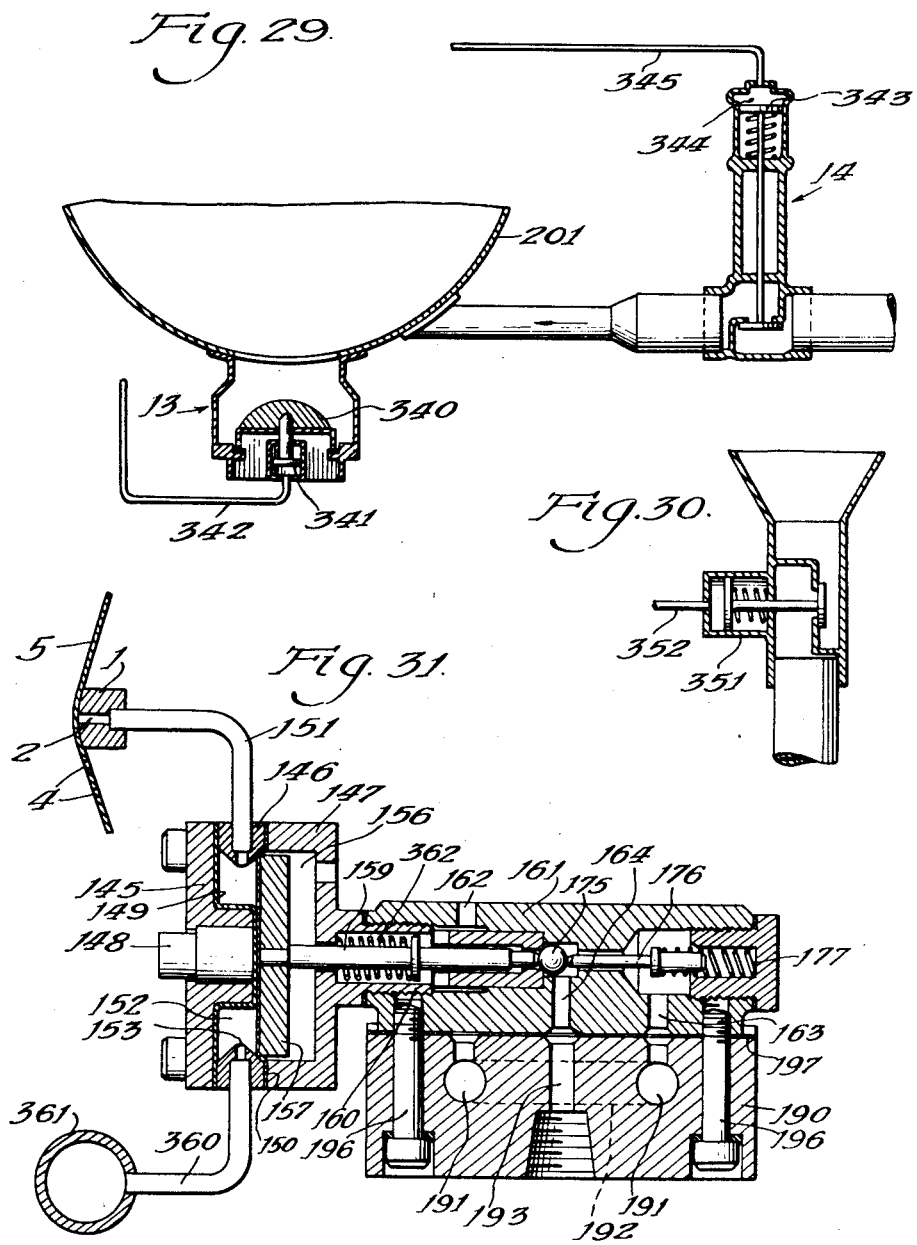

Patented Apr. 11, 1950

2,504,013

UNITED STATES PATENT OFFICE 2,504,013

CLOTHES-WASHING MACHINE AND AUTOMATIC FLUID OPERATED CONTROL DEVICE THEREFOR

Hubert C. Ellis, Evanston, Ill., assignor to The Ellis Drier Co., Chicago, Ill., a corporation of Illinois Application December 1, 1944, Serial No. 566,137

20 Claims. (Cl. 68—12)

This invention relates to new automatic control devices adapted for various uses, including the automatic coordinate control and operation of the devices associated with a washing machine, in the performance of a complete commercial or other washing operation. The invention includes new conceptions of use of a perforated tracker sheet, either in rolled or in endless or band-like form, as a primary or master-station device for controlling fluid. This sheet has openings adapted to register with tracker bar passages, so that when the openings and passages are registered, a device in communication with a particular tracker bar passage is operated. The control device thus acts as a coordinator and timer.

This invention is directed to improvements in automatic timing devices as primary controls in commercial or other washing operations, or equivalent operations in which a plurality of devices having different functions are coordinately or separately controlled for accomplishing some ultimate common result. I am aware that attempts have been made to provide timer controls, but all of those known to me depend primarily on control of electrical contacts by slotted disks or cylinders, in turn operating solenoids or electrical relays. The use of primary electrical control is objectionable for several reasons, among which are: contact wear, poor contact, arcing, contact failure, and solenoid failure.

In some devices known to me, disks are used as insulating elements, against which electrical contact fingers ride and by which they are insulated from a conducting element arranged below the disk, the disk must have specially cut slots of different lengths through which an electrical contact passes to engage another contact member. In another device known to me, the ends of a series of pipes scrape against a rotating disk, a very impracticable device. In another device known to me, slots are specially cut in a sheet which is attached to a suitable cylindrical base and this cylindrically shaped sheet has slots therein through which electrical contact fingers act. All such slots must be specially cut, and no tool of single size or shape can be used.

A particular objection to the use of disks and cylinders is, that it is impossible to obtain accurate timing with them, without making them so large as to be impracticable. Now in the control of commercial washing operation, and particularly in the control of liquids used in such an operation, the valves which control the inflow of those liquids must be opened for a predetermined time, which for a predetermined rate of flow of the fluid determines the quantity of fluid delivered. In the case of the delivery of soap, blue, bleach or sour solutions, it is important to deliver exact quantities. The quantity delivered is, therefore, important and timing of delivery must be accurate. It is not possible with the devices known to me to obtain accurate timing, particularly for short periods, as when controlling the mixing of soap or other chemical solutions, and the delivery of such solutions at a certain flow rate for an exact length of time to obtain exactly the volume of liquid required. For such a problem this invention offers a complete solution, not obtainable by any automatic control means known to me.

There are types of the devices in which a flat rotating disk is used, this disk has concentric circular rows of openings. The lengths of these circular paths decrease or increase in diameter respectively as their radii of generation decreases or increases. Therefore, spacing between the slots of the shorter paths or rows must be very close, and the slots must be much shorter. Sufficient accuracy cannot be had with such short slots, and the use of such slots to control the making and breaking of electrical contacts is quite objectionable.

It is not necessary in the present invention to use slots or to depend on the length of openings, because all of the openings are of the same size and their spacing in relation to the passages of the tracker bar herein are so arranged that continuous action can be obtained by a plurality of separate but consecutively acting openings all of the same size and preferably circular, thus avoiding the problem of slotting and of varying lengths of openings.

Another advantage of the present invention is that continuous action can be obtained either by spacing of the openings in groups, or intermittent or continuous action can be obtained by venting at varying rates a pressure chamber, the pressure to which is controlled by the tracker sheet and bar of this invention.

Objects of the invention are: To very much simplify and reduce the cost of primary timer control devices; to provide an all-fluid main control; to provide a low pressure primary or master control in combination with a high pressure direct control of the devices; to primarily control timing by fluid instead of electrically; to provide for manual control while the primary automatic control is operating; to provide a wide range of timing accuracy by making tracker sheets of longer or shorter lengths, and/or by wide or narrow spacing of the openings of groups of openings to obtain continuous action; to provide a very compact structure as a primary control unit; to provide a new type of sheet having means adapted to guide an operator to the location of the required control openings preparatory to cutting or punching; to control fluid operation of devices by venting action in relation to the rate of movement of the sheet and in relation to the spacing of the openings in the tracker sheet; to provide for the first time for the automatic remote and/or selective control of the delivery of variable amounts of water or chemical fluid by means operated by a meter, including a water meter; and to provide for the first time means for automatically and/or selectively setting a water temperature-regulating device and for resetting the same, either separately or coordinately with the setting of the device which is controlled by metering action to deliver the proper quantity of chemical or of water, for mixing at the temperature called for.

Features of the invention include: The utilization of a tracker bar and tracker sheet as a means for coordinately controlling a plurality of devices of different functions; the use of such means in timed sequence control of the various instrumentalities associated with a washing machine for automatically carrying out a complete washing operation; the use of the tracker bar and sheet principle for the automatic control of a temperature regulator device; the tracker bar and sheet control of a device having the structural characteristics of the type of temperature regulator device shown herein; the use of such a bar and tracker sheet in the fluid control of a diaphragm-operated valve or switch control device; the use of tracker bar and sheet for sequentially controlling a plurality of plungers to move them from initial positions and for variable but predetermined distances and for returning the plungers to initial positions; a control chart capable of use in conjunction with a tracker bar in which all control is obtained without the use of slots but by a method of spacing of separate openings, all of the same size and shape, in relation to the openings of the tracker bar to obtain continuous action without the use of slots; and the use of tracker bar and tracker sheet for the timed sequential control of any number or kind of differently constructed devices which cooperate in a washing operation.

Other features of the invention relate to uses of the bleeder or vent openings; the use of a diaphragm unit having two means of control; the use of valves, each automatically or manually controllable; and the control of the water volume by timing instead of by the use of float-operated indicators, it being understood that the indicators of the floats are no longer accurate as the level of the water in the washer changes, due to centrifugal and other actions within the washer, particularly at high speeds.

Objects, features and advantages of the invention will be pointed out in a description of the drawings, in which drawings:

Figs. 1 and 1A are parts of a single view, diagrammatically representing the application of my invention for the control of a commercial washing operation;

Fig. 2 is a vertical section through the primary automatic control unit, taken approximately on line 2—2 of Fig. 3;

Fig. 3 is a vertical section taken approximately on line 3—3 of Fig. 2;

Fig. 4 is a horizontal section of the control unit taken approximately on line 4—4 of Fig. 3;

Fig. 5 is an enlarged view of portions of the device shown in Fig. 2 further illustrating the construction for preventing operation of any device, during rewinding of the tracker sheet;

Fig. 6 is a front view of the control unit with the door closed and looking through the observation window at the tracker sheet;

Fig. 7 is a side view of the control unit showing the device for holding the door in sealing relation;

Fig. 8 is a horizontal detail section showing the door-controlled device for automatically shutting off pressure supply to the chamber of the control unit when the door is opened;

Fig. 9 is a vertical section through one of the manifolds and through one of the diaphragm-controlled units operatively associated with a double-ball type of valve;

Fig. 10 is a view similar to Fig. 9, but showing a single-ball type of valve operated by the diaphragm unit;

Fig. 11 is a view similar to Fig. 9 showing the diaphragm unit operating a switch which is attached to the manifold, and showing the switch closed;

Fig. 12 is a view similar to Fig. 11 showing a different type of mounting for a switch which is operated by the diaphragm unit, and showing the switch open;

Fig. 13 is a front view showing the control valve and switch station structure;

Fig. 14 is a vertical section taken approximately on line 14—14 of Fig. 13 showing the arrangement of the manifolds and valve structures and switches associated therewith;

Fig. 15 is a rear elevation of the upper manifolds viewed from line 15—15 of Fig. 14 and looking in the direction of the arrows, and illustrating the compact arrangement of the manifolds, and valves and their operating means;

Figs. 16, 16A, 16B and 16C illustrate portions of one and the same tracker sheet, of a type adapted for controlling the devices shown in Figs. 1 and 1A;

Fig 17 is a detail view illustrating the method of obtaining continuous controlling action by the relative spacing of openings in the tracker sheet in relation to a passage of the tracker bar;

Fig. 18 is a diagrammatic view illustrating how the amount of water delivered to the washer is automatically controlled by the tracker bar and sheet and by means operated by the water meter;

Fig. 19 is a vertical section taken approximately on line 19—19 of Fig. 20 and showing the relation of the selective setting devices for the meter-operated water cutoff means;

Fig. 20 is a vertical section taken approximately on line 20—20 of Fig. 19;

Fg. 21 is a vertical section taken approximately on line 21—21 of Fig. 20;

Fig. 22 is a detail horizontal section taken on line 22—22 of Fig. 19;

Fig. 23 is a diagrammatic view showing how the temperature regulator controls the mixing valve;

Fig. 24 is an elevation partly in section illustrating the means for automatically and selectively moving a part for setting and resetting the temperature-regulating mechanism shown in Fig. 23;

Fig. 25 is a front view of the upper part of the right-hand side of Fig. 24 showing the dial;

Fig. 26 is a vertical section taken approximately on line 26—26 of Fig. 25;

Fig. 27 is a detail horizontal cross-section taken on line 27—27 of Fig. 26;

Fig. 28 is a rear view of a washing machine showing somewhat diagrammatically in association therewith the devices herein controlled, including the primary control station boxes;

Fig. 29 is a diagrammatic view showing the relations of the dump valve and the steam valve to the washer;

Fig. 30 is a view showing a type of self-closing valve used for control of the chemical supply tanks and adapted to be used for water control;

Fig. 31 is a diagrammatic view showing a modification; and

Fig. 32 shows how certain of the elements are arranged when an endless tracker sheet is used.

To facilitate an understanding of the present invention, and its specific application to the control of a washing machine and associated devices for performing a commercial washing operation, a general description of the elements involved in a washing operation and their functional relationships is given before descriptions of the details of the various novel devices per se, and combinations of novel devices per se, are given.

Referring to Figs. 1 and 1A. The numeral 1 indicates a tracker bar having a series of openings or passages 2 therein, in number suitable for controlling separately or coordinately any desired number or kinds of devices or elements. In this instance this bar is enclosed in a fluid pressure chamber which is indicated at 3. Mounted in the chamber are suitable rolls for supporting a sheet of material indicated at 5 for timed movement in sealing relation with the bar. The sheet has perforations 4 therein which are registerable with the passages 2 of the bar. In this instance when any opening 4 in the sheet registers with an opening in the bar, air under pressure is admitted to the passages 2. In the present embodiment of the invention pressure is low, for example, 2 to 4 pounds.

Each one of the openings 2 is connected by a pipe line with a chamber, of a control device, one wall of the chamber being formed by a diaphragm. This diaphragm controls the movements of a valve or of an electric switch. When a valve is used it in turn controls the operation of a device or element by means of fluid at higher pressure. Certain of these diaphragm valves are herein arranged in two sets, one set being connected with a high pressure manifold 6 and the other in relation to a high pressure manifold 7. The diaphragm valves are generally indicated by the numeral 8 and the manifolds 6 and 7 are of substantially the same construction. Their structures are features. Each diaphragm is also operable by push button 10, so that the valve can be operated manually as well as automatically. The valve can be operated manually independently of its automatic operation by the tracker bar and sheet to extend the time of operation. This is a valuable feature.

Each of these diaphragms as controlled by low pressure admits high pressure air to the device on the washing machine or associated with the washing machine, which device is to be automatically and remotely controlled as a result of the registration of the perforations of the tracker sheet with the openings of the tracker bar.

The washing machine has a washer-driving motor 12 which is under the control of the tracker bar and sheet. The washing machine has a fluid pressure-controllable dump valve 13 and also has a fluid pressure-operable valve 14 by which entry of steam can be controlled. There is also included means for supplying water in the proper quantity, as well as mixing hot and cold water to obtain water at the desired temperature, this means being generally indicated at 15, and this means includes a meter and a mixing valve. This mixing valve is adapted to be set through and thermostatically controlled by a temperature regulator device generally indicated at 16. The selective setting and resetting of the temperature regulator is under the control of the tracker bar and sheet. This, as well as the other devices used in washing, can also be set manually. The provision of both automatic and manual control is also an important feature. Manual operation can be obtained while the automatic control is connected and automatic control is automatically resumed after cessation of manual control.

Also associated with the washing machine are tanks 17, 18, 19, 20, respectively for soap, sour, bleaching and bluing solutions. There is also a soap supply line 21, and all of these elements are controlled herein by means of fluid-operable valves, under the master control by the tracker bar and sheet. Ordinarily the valves are spring-closed, and are held open by fluid pressure for a timed interval.

In this instance air under pressure is preferably used as the operating medium, but it will be understood that liquid may be used or that some or all of the devices may be operated by liquid or by vacuum under automatic control of the tracker bar and sheet device. In the case where air is used, the high pressure air may be supplied at about 75 pounds per square inch through the pipe 22. In the diagram Figs. 1 and 1A, the heavy solid lines represent high pressure air lines, the dotted lines represent low pressure air lines, and the thinner full lines represent electrical circuit lines.

Connected with the high pressure supply line 22 is a supply line 23 which leads to a high pressure guage 24 at the control unit, and to a reducing valve 25. From this line 23 a high pressure line 26 leads to a master manifold 27, thence through a normally open valve 28 attached to the manifold. From this valve 28 high pressure line 29 leads through branch connections to manifolds 6 and 7. When the normally open valve 28 is closed the high pressure air to manifolds 6 and 7 is cut off and the pressure fluid in these manifolds is vented at valve 28. This venting and cutting off is a feature of the invention and has to do with the operation of rewinding of the tracker sheet and will be later referred to.

High pressure air is delivered through the manifolds 6 and 7 for control by valves, which are in turn diaphram-controlled by low pressure. The reducing valve 25 reduces the air pressure in low pressure line 31 to about 2 to 4 pounds and this line is connected with a low pressure guage 32 and with a valve 33 in the pressure chamber 3. This valve is controlled by a sealing and observation door of the chamber, so that supply air under pressure to the chamber is cut off when the door is opened, and is introduced into the chamber when the door is closed. This is later more fully described.

Inasmuch as the tracker bar 1 is in the low pressure chamber it will be understood that when an opening in the tracker sheet registers with a corresponding opening of the tracker bar, air under pressure will pass through an opening or passage 2 of the bar, thence to a diaphragm chamber of a corresponding valve 8. Each one of the passages 2 is connected by a low pressure line, represented in dotted lines, with a corresponding diaphragm chamber of one of the valves 8.

A feature of this invention consists in the control by means of a cooperating perforated tracker sheet and perforated tracker bar, of a complete commercial washing operation, and diagram of Figs. 2 and 1A illustrates one application of this phase of the invention. In this case provision is for the first time made to automatically control the temperature and quantity of the water delivered to the washer, and to selectively cause delivery of varying quantities of water at varying temperatures. For example, water may be delivered at any one of five or more different temperatures, and in four or more different measured quantities. The use of tracker bar and sheet permits a very great range of control as to quantity and temperature and timing, and timing can be very accurately controlled for all purposes. The control valves 8 have legends indicating their general purpose herein.

There are also automatic and manual controls for dumping the rinse water and washing solutions. Means is provided for turning the water on and off and for regulating its temperature by automatically setting a thermal regulator. There is means for automatically resetting the regulator at zero position. Means is also provided and so associated with the water meter that movement of the meter automatically cuts off the water supply after a measured amount of water has been delivered to the washer or tub. The invention herein can be applied for the control of a domestic or noncommercial washing operation.

In order to move and time the movement of the tracker sheet 5, to automatically control al other devices, a suitable tracker motor 39 is arranged in the pressure chamber. Suitable circuits and holding circuits are provided for controlling the motor. The starting circuit is controlled by a manual starting switch indicated at 40. On pressure of the button of this switch the tracker motor and its holding relay are energized, the holding circuit passing through a contact 41 which in this system is broken automatically through tracker sheet opening control as soon as the washing operation has been completed, by admission of low pressure air to the diaphragm chamber of valve 42. This switch may also be opened manually. The speed of the tracker motor can be varied to vary the speed of motion of the tracker sheet.

The washer motor 12 has a suitable circuit and holding circuit and is adapted to be automatically started by the tracker sheet by operating the switch 45 by admission of low pressure air to the diaphragm chamber of the valve 46. The washer motor is automatically stopped by admission of low pressure air to the diaphragm chamber of valve 47 to break the contact of the switch 48.

After the tracker sheet has completed its control run for a complete washing operation it must, in this embodiment (but not necessarily in all embodiments), be rewound. However, during this rewinding the pressure fluid must be so controlled that there is no high pressure operation of the washer devices. Therefore, for rewinding there has been provided a clutch mechanism later to be described which is manually moved to allow rewinding. A feature of the invention is that high pressure fluid is made ineffective to operate the washer devices when the clutch is operated to allow rewinding. For this purpose a valve 50 is arranged in the pressure chamber and is connected by a low pressure line with the diaphragm chamber of valve 28 mounted on the master manifold 27. This valve controls air from the master manifold 27 to the manifolds 6 and 7 and is normally open to allow high pressure fluid to fill the manifolds 6 and 7. When the valves 50 and 28 are operated, high pressure air from the line 26 to the line 29 is cut off and the manifolds 6 and 7 are vented at the valve 28. Thus, during tracker sheet rewind no high pressure operation of any of the washer devices can occur. This is a feature of the invention.

The water is controlled through valve 53 operated by low pressure applied to its diaphragm. When this valve is operated, high pressure air is admitted to line 54, thence in one direction to line 55 and past the check valve 56 to line 57 which operates diaphragm of the valve 58, which interrupts and vents high pressure fluid supply through line 59 to the water control valves and allows those valves to automatically open to supply hot and cold water to the washer via a water meter. See Fig. 18. By means of the check valve 56 the pressure is also held in a vent line 60, connected with a vent valve represented in Figs. 1A and 18 by numeral 61. This vent valve 61 is automatically controlled by the water meter to be opened (immediately after delivery of a predetermined amount of water) to vent the line 60 and therefore the line 57 to correspondingly operate the diaphragm of the valve 58 to allow high pressure fluid to enter line 59 and close and hold closed the hot and cold water valves. When the water valve 53 is operated, pressure is also sent through line 63 to operate a temperature regulator reset mechanism to bring it to zero position, after which the regulator is, by means of tracker sheet control, again automatically set at another and proper position to regulate the temperature of the next charge of water delivered to the washer.

It is believed to be entirely new to provide any type of control by which the action of a water meter automatically stops delivery of water when the proper quantity has been delivered, and/or to provide means for selectively setting meter-operable means for obtaining varying amounts of water. Moreover, I do not believe that anyone has ever controlled any of these operations by means of a tracker bar and sheet combination of the character shown herein.

*Control unit or station*

A feature of this invention relates to the construction and operation of a control unit as a box or chamber, and as a primary control station of small size, adapted to be placed on a machine to be controlled, or to be remotely placed, as in an office, to control any number of separate devices simultaneously or in coordinated and timed sequence. In this embodiment the control unit is placed on the washing machine, but it may be placed at a point remote from the machine. The unit provides means by which pressure or vacuum connections can be made with whatever devices are to be controlled. A feature is that the unit provides a pressure chamber as a supply reservoir for fluid, for entry through the registered openings of the tracker bar and sheet. Air at atmospheric pressure may enter these openings.

Referring now to Figs. 2 to 7, and first to Fig. 3. The unit comprises a casing 70 closed at the front by an inspection door 71, and at the rear by a removable plate 72. The rear closure plate 72 forms a support for certain of the devices within the chamber, one a holding relay for the tracker sheet motor. The tracker bar 1, forms part of a sub-unit which is adapted to be assembled and then introduced into the chamber through an opening 73 in the bottom wall of the casing 70. This unit comprising a plate 75 which is removably secured at the outside of the casing by bolts in sealing relation with the opening. On this plate are secured two spaced tracker bar brackets 76 which support the tracker bar 1, horizontally in the manner shown. Only one bracket is illustrated. The tracker bar has a plurality of passages or openings 2. Each tracker bar opening 2, communicates with a pipe which is preferably soldered to the bar. The opposite end of each pipe 79 is suitably secured to a connector 80, which is screwed into and passes through the plate 75 to project below and outside of the chamber.

For the embodiment of Figs. 1 and 1A there are twenty pipes secured to the tracker bar in communication with corresponding passages 2. There may be extra or spare connectors 80. One of these is for the pipe line which connects the valve 50 with the diaphragm valve 28. As shown in Fig. 1, the bar 1 has a few "spare" passages and the plate 75 of Fig. 3 may have corresponding spare connectors 80 which will be closed when not in use, so that the low pressure may be maintained in the pressure chamber. All passages of the bar will have pipes which pass through the plate 75 and which are provided with connectors 80.

All of the pipes used for washer control are shown only in Figs. 1 and 1A. Only some of the pipes are shown in other figures. Each connector is adapted to have another pipe 82 secured to it by means of the coupling nuts at the outside of the pressure chamber but within the valve and manifold chamber 83 (see Fig. 14) upon the top of which chamber 83 the pressure chamber 70 is secured. These pipes 82 deliver low pressure fluid to the diaphragm chambers of the relay or intermediate valve or switch devices, which in turn control either high pressure fluid for operating the devices of the washer, or for operating electrical switches. It is to be noted that there is no primary electrical control. Primary timer control is only by fluid, even for the electrical switch devices. The diaphragm unit is believed to be of novel structure.

I believe it is entirely new to time-control diaphragm-operable relay or intermediate means, or any other usuable means, by the action of fluid which passes through tracker sheet openings and tracker bar passages, where the sheet moves across a bar and forms a seal for the passages except during registration, and/or to use a tracker bar and sheet for coordinately controlling devices having entirely different functions, as illustrated by the control of washer devices herein.

A feature of the control box is the mounting of the supply and winding spools for the perforated control sheet and the driving means for the spools on a common support which can be swung forwardly to a point outside of the chamber for servicing. Door 71 is normally closed and sealed and has a glass window through which to observe the control chart or tracker-sheet 5 and markings thereon, as it moves during its controlling action.

Referring first to Fig. 2. The two plates 87, 88, are suitably pivotally mounted to swing about parts of two axially aligned structures. These plates are suitably cross-connected to form a frame. Each pivoting structure includes a tubular plug about which a plate swings. For plate 87, this plug is held by a sleeve 89 which is threaded into the vertical side of the casing 70 and is held by a clamp nut as shown. The opposite plate 88 swings about a similar tubular plug which enters a similar sleeve 90 held in the opposite vertical wall. The sleeves serve as mounting and journalling means for a spool, and for allowing connection and disconnection of the spool. This tracker sheet spool 91 is provided with an opening in its end crossed by a pin 92 and this cross-pin is engaged by a terminal slot of a rotative shaft 93 which extends through the plug and through packing to a point outside of the casing where it is provided with a thumb knob or wheel 94, thus providing means whereby the supply roll can be turned or adjusted for rewinding while the pressure chamber remains sealed by the closed door 71. A suitable packing surrounds this shaft and a spring presses a packing gland against this packing to provide a slip-friction device which resists rotation of the shaft and spool to keep the tracker sheet taut against the bar 1 while the sheet 5 is being driven. The spring is held by a removable cap.

The opposite end of the spool 91 has a recess receiving a pin 96 which slides in the tubular plug. Means is provided for translating the pin 96. This means comprises a slidable ring 97 having a cross-pin slidable in a pair of diametric slots in the tubular member 90. A spring presses the shaft into engagement with the recess of the spool.

In Fig. 3 dot-and-dash lines represent the position of the plates as during servicing or loading. The sheet is driven in this instance by means of a synchronous motor 99 which is secured to the plate 87 and has a spur gear 100 meshing with a larger spur gear 101, in turn meshing with a still larger spur gear 102 which drives the tracker sheet receiving or windup spool 106, see Fig. 4. Gear 102 meshes with a gear 107 which in turn meshes with a gear 108 of driving spool 109. Change gears 100A and 101A shown in dot-and-dash lines are provided to vary the timing speed of motion of the sheet 5. By the use of a shiftable quadrant a larger number of speed changes may be had, conformably to the character and number of different kinds of devices, to be controlled and coordinated by the tracker sheet.

The driving spool 109, see Figs. 2 and 4, is secured to a shaft 110 which passes through suitable bearings in the plates. The gear 108 is mounted on a shiftable hub 111 having a groove engaged by the pins of a shaft lever 114. The gear 108 can therefore be moved out of mesh with gear 107, when rewinding of the tracker sheet is required. Gear 102, see Fig. 4, is mounted on a slip-friction driving hub 115 of shaft 116 to which the receiving spool 106 is fixed. Rotation of hub 115 on the shaft is resisted (but not prevented) by a spring-pressed shoe.

The slip-friction provided for the receiving roll 106 is for the purpose of compensating for the constantly changing diameter of sheet as it winds onto this roll 106.

The rotation of the supply roll 91 is frictionally resisted so that a taut condition of the flexible tracker sheet against the tracker bar is at all times maintained, and it is noted by reference to Fig. 3 that the maintenance of this taut condition of the sheet tends to more strongly press the sheet against the tracker bar, to maintain a sealed relation with the tracker-bar passages. The gears 102 and 108 are of the same diameter.

As previously mentioned; during the operation of rewinding the tracker sheet 5, means is provided for preventing high pressure operation of any of the devices, in this instance by venting high pressure through what may be considered a master high pressure control valve. High pressure is cut off to all of the manifolds with the exception of the receiving manifold 27.

Referring to Figs. 1 and 5. The valve structure generally designated 50 comprises a ball 119 normally seated and held seated by a spring 120 to prevent entry, through opening 122, of low pressure air from the chamber 70 into pipe line 121. Pipe line 121 connects with the diaphragm of valve 28 and that part of it which is within the pressure chamber has flexible play to allow the frame, which supports the tracker sheet and its driving means, to be swung to the dot-and-dash line position of Fig. 3.

A pin 124 can unseat the valve 119 when the knob 126 is pressed inwardly to move the lever 114 to "clutch-out" position. A feature is that the strong spring 120, acting through ball 119 and pin 124, holds the clutch lever in "clutch-in" position or at least prevents unwanted clutch release. When the frame, on which the tracker sheet and its supporting and driving means are disposed, is to be moved to the dot-and-dash line position of Fig. 3, a latch 127 is swung upwardly to engage the lower part 128 of the clutch lever 114 to hold that lever in "clutch-out" position. At the same time, valve 119 is unseated and so remains until the tracker-sheet frame again assumes its position of Fig. 5. When there is no necessity for substituting one tracker sheet for another, and when only rewinding is necessary, door 71 remains closed, and the clutch 114 is unclutched by means of the button 126, and the valve 119 is opened to cut off high pressure fluid, to the manifold, while rewinding is going on.

The inspection door 71 is hinged on vertical pivots (see Fig. 6) and is provided with sealing means such as gaskets. See Fig. 3. The door is also provided with a pane of glass through which the markings on the tracker sheet 5 may be viewed.

The door 71 is held closed by a suitable device best shown in elevation in Fig. 7, which includes a loop 129 engaging over a projection 130 of the door and a lever 131 to which the loop is pivoted, said lever being pivoted to a projection of the frame. In this instance the clutch lever operating button 126 lies within the loop. To release the door the lever is swung to the left, about its pivot.

Referring to Fig. 4. Cushion bumpers 133 are provided between which the plates of the frame are held against movement when the door is closed. Two of these bumpers are shown, one for each plate at the rear of the casing, and two, one for each plate, are mounted on the door. When the door is closed the door bumpers are adapted to engage the front edges of the plate and hold the rear edges of the plates against the rear bumpers. Thus, the frame is firmly held during operation of the device.

The door 71 is provided at the margins of its window or pane of glass with pointers 134 aligned horizontally and projecting inwardly from opposite sides of the window opening at the level of the tracker bar openings to facilitate observation of certain indicia on the tracker sheet or chart and the marginal numbers on the sheet representing in this instance total minutes of action. The chamber 10 is provided in its bottom wall with a pressure relief check valve 136.

Referring to Figs. 1 and 8 which show the door-controlled inlet valve through which pressure fluid enters the pressure chamber. This valve has been previously generally referred to by the numeral 33 in Fig. 1. In Fig. 8, it is shown in open position, as when door 71 is closed and sealed. Part of the pipe line 31 is shown in this figure and the valve is indicated at 138. It is held off of its seat, against the action of the spring 139, by means of a translatable pin generally designated 140, which is engaged by an element 141 on the closed door 71. The valve 138 seats when the door is opened and this prevents delivery of fluid via 31 and passage 142 into the pressure chamber.

*Control valves and switches*

An important feature of this invention relates to means at the control station by which operation of the devices at the washing machine can be controlled manually, while the automatic control through the tracker bar and sheet is operative. I believe it is entirely new to provide means whereby the period of automatic operation can be extended by manual control, while the automatic control device is operating. This feature is in part related to the use of a diaphragm unit which can be operatively attached to a suitable mechanism, including a valve mechanism, and a switch mechanism. This diaphragm unit is illustrated in Figs. 9 to 12, inclusive.

Referring to Fig. 9. The diaphragm structure comprises in this instance an outer section 145, a middle annular section 146 and an inner chambered connector section 147. Between the members 145 and 146 is clamped a diaphragm 149 specially shaped to have considerable excursive motion, inwardly. Between the members 146 and 147 is clamped a second movable diaphragm 150. These two diaphragms form a chamber 152 into which fluid under pressure is admitted through a suitable pipe 151, at a rate greater than, that at which the fluid can escape from the chamber through a venting opening for the chamber. In this embodiment this pipe communicates with one of the passages 2, of the tracker bar 1. The simplicity of the connection by which the tracker bar and sheet directly control admission of fluid to the chamber 152, is a feature. The diaphragm-formed chamber 152 has the venting opening 153 in its ring member 146. This venting opening is controlled by a valve such as a needle valve 154. The adjustment of the venting rate in relation to the openings of the tracker sheet is a valuable feature of this invention which is later referred to.

Within the chamber 156 of the connector element 147 is a disk 157 engaged with the diaphragm 150 and movable by that diaphragm when fluid pressure is applied to the chamber 152. This disk 157 has a pin 159, slidable in and projecting beyond a threaded extension 160. The threads are made so as to fit corresponding threads of various devices to which the diaphragm unit is to be attached, in this instance to valve casings and switch casings.

In Fig. 9 the diaphragm unit is attached to a valve structure which includes a valve casing 161 having a vent passage 162, an intake passage 163 and an outlet passage 164. A single longitudinal passage 165 communicates with these passages as shown. Valves 167 and 168 respectively control intake and venting. When one is closed the other is open. In this case valve 167 is normally closed. A pin 169 engages the valves as shown. A spring 170 moves the valve system and the disk and the diaphragm to the initial positions shown, at which the diaphragms are in contact. When pressure enters the pressure chamber 152 the whole control system is moved to the right (Fig. 9), in which case the vent 162 is closed and the intake 163 is opened to the passage 164.

In Fig. 10 the element 159 engages a single valve 175 at one side, and the opposite side of the valve is engaged by a pin 176 pressed by a spring 177 to move to and normally hold the disk 157 at the position of Fig. 9, in which case fluid from passage 163 would be delivering to passage 164. Fig. 10, however, shows the parts positioned as when pressure is in the chamber 152, so that, fluid cannot pass from 163 to 164. A valve of this normally open, single ball type is indicated at 28, in Fig. 1, and controls fluid flow from manifold 27 to manifolds 6 and 7.

In Fig. 11 the diaphragm unit has its pin 159 arranged to move a switch lever 180 against the action of a spring 181 to break the contact with terminal 182, of device 183 which is secured to a mounting plate 184. When fluid enters the chamber 152 under pressure, the pin 159 is moved to the right and the contact is broken.

Fig. 12 shows generally the same kind of switch as is shown in Fig. 11, but the switch plate 184 is mounted on a plate 185 instead of on a manifold. The spring is held in tube 185 carried by the plate.

I believe it is an entirely new conception to use a tracker bar and tracker sheet combination to control fluid entry to a vented chamber, and/or to supply fluid at a greater rate than it can be vented.

The diaphragm 149 functions as a seal between the bore in which the button 148 slides and the pressure chamber 152. This is a novel, cheap structure allowing a very free movement of the button, because no special packing for it is necessary.

An important feature of this invention is therefore tracker bar and sheet control, of the rate of entry of fluid at a predetermined pressure into a power chamber which has a venting opening which vents at a lesser rate than the rate of introduction of fluid into the chamber. In this way balance of pressure or volume can be obtained with great accuracy by varying the rate of motion of the sheet and by varying the spacing of the openings of the sheet. In the present embodiment the chamber is part of a structurally simple control unit which is adapted to be connected to various valve or switch devices to be operated. One wall of the chamber is formed by a control or power diaphragm. The arrangement is therefore such that the rates of introduction of fluid and the venting rates can coordinately determine the degree of pressure on the diaphragms, as well as length of time that the diaphragm shall be held in one of a plurality of active control positions. Thus the degree of motion as well as the time which the diaphragm is held at any one of a plurality of positions can be controlled by venting and tracker bar and sheet timing. In this instance a spring or equivalent device is provided for automatically moving the diaphragm to an initial position from which it is moved by pressure.

An important function of this invention (see Figs. 9, 11 and 12) is subserved through a push button 148 by which the diaphragms 149 and 150 can be moved, to move diaphragm 150 independently of pressure applied to the chamber 152. Diaphragm 149 is shaped and mounted as shown, to permit sufficient motion by means of the button to move the diaphragm 150 to operate the valve or switch.

The use of a variable vent such as 153 and 154 for the diaphragm chamber 152 is important, in relation to the tracker-sheet control. The size of the vent, and therefore venting time can be varied. The rates of venting in relation to the spacing of the openings in the control sheet is also important for obtaining continuous controlling action by a plurality of linearly spaced circular openings of the tracker sheet, which are all of the same size and shape. By using a smaller vent the time required to vent is increased and continuous control action by widely spaced openings in the sheet is made possible. By using a larger vent and obtaining faster venting, closer spacing of the openings in the sheet is made possible. Thus, the use of the vent in relation to the spacing of the openings at the tracker sheet provides for a wide range of selection as to the total number and/or spacing of a group of tracker sheet openings. Venting can be used either in pressure-controlled scheme and system, or in a vacuum-controlled tracker system. Another feature relates to the close spacing of groups of tracker sheet openings to obtain continuous action.

Another feature of this invention relates to the interchangeable arrangement of the valve casings or switches in relation to a manifold, such as is generally indicated at 6 or 7 or 27, in Fig. 1. A manifold block is indicated at 190 and in this case all of the manifolds are of exactly the same construction and dimensions. Each manifold has two longitudinal fluid pressure passages 191 cross-connected by a passage 192 shown in dotted lines, so that when either one of the passages 191 has fluid under pressure therein the other passages are also supplied. Each manifold also has a number of vertical passages 193. There may be nine of the passages to correspond to the number of valve casings 161, see Fig. 15. Each passage 193 communicates with a corresponding passage 164 of a valve casing 161 or with a passage of any other type of valve. This passage 193 is arranged midway between the passages 191 and each of the passages 191 communicate with a short passage 194, which in turn is adapted to communicate with a corresponding passage 163 of the valve casing.

Because of the symmetrical relation of the openings 191 and 194 to the central passages 193, the valve casings 161 may be turned end for end and when so turned will have their passage 163 and 164 in communication with one or another of the passages 194 and also with the passage 193. The fastening devices 196 are also symmetrically arranged in relation to the passage 193, and in this way a valve casing 161 or the plate 184 of a switch can be connected to the manifold.

All openings of the manifold, which are not in use are of course sealed. A gasket 197 is introduced between the valve casing 161 and the manifold 190. At the left in Fig. 9, the casing 161 seals passage 194. In Fig. 11 both passages 194 are sealed by a gasket and passage 193 is sealed by a plug 199. Each gasket has two openings which register with the openings 194 so that communication may be established between passage 194 and passage 163.

The value of this manifold arrangement will be evident from an inspection of Figs. 13, 14 and 15. In the latter figure it will be seen that as many as nine valves can be placed on each of the manifolds, nine on the bottom of the top manifold 6, and nine on the top of the bottom manifold 7. They are placed in reversed relation as best shown in Fig. 15. The diaphragm units project beyond the manifolds.

Manifold and valve switch chamber

In Figs. 13 and 14 is shown the casing 83 on the top of which the control unit or pressure chamber 70 (see Fig. 3) is attached. Attention is particularly called to the compactness provided by a new manifold arrangement. All of the intermediate control elements such as valves and switches, between the control and pressure chamber 70, and the devices at the washer 201 (see Fig. 28) are contained in this relatively small casing 83 which may measure 7 x 10 x 13 inches. The control chamber 70 may measure about 7 x 9 x 10 inches. Compactness is related to manifold arrangement and to the disposal of the valves and switches on the manifolds in casing 83, and to the use of a tracker bar and sheet control device in chamber 70. This control unit may be located in an office or central station from which a number of washing machines can be automatically or manually, and selectively coordinately and remotely controlled.

A feature of this control station is the arrangement of the diaphragm-operated devices on the manifolds. In this instance there are three manifolds, two upper and one lower. These manifolds have been previously referred to in the description of Figs. 1 and 1A. The upper manifold designated 6, the one below it as 7, and the lowest one as 27. In the detailed description, the manifold has also been designated 190. Referring to Figs. 14 and 15. The manifolds 6 and 7 are secured together in spaced relation by vertical struts 203. Fig. 15 is a rear view looking from the line 15—15 of Fig. 14, in direction of the arrows. For convenience, all pipe connections to the manifolds and diaphragms have been omitted in this figure but the general relations of these connections are shown in Figs. 1 and 1A and some of the piping is shown in Fig. 14. Each device of Fig. 15 has a valve of the type of Fig. 9. It will be noted there are nine devices compactly arranged on the bottom of the upper manifold and nine arranged on the top of the lower manifold 7. In order to operate the buttons 8 or 148, of the diaphragm-control valves whose diaphragm chambers face rearwardly as in Figs. 14, 15, slidably operating rods 207 (see Fig. 14) are used to move rocker arms 208 suitably pivoted to brackets 209 on corresponding diaphragm chamber casings. Only two of the rocker-arm brackets have been shown in Fig. 15. The rods, eight in number, are guided in cross-pieces 210 connected to the struts 203. These push rods 207 have push buttons 211 accessible at the front as shown in Figs. 13 and 14. The diaphragm buttons 148 at the front are operated by short push rods which also have buttons 211. See Fig. 14. Each one of the diaphragm chambers of the structures shown in Fig. 15 is supposed to be connected by a pipe 82 with one of the connectors 80. Some of the connections are shown in Fig. 14. The arrangement of the buttons 211 at the front of the casing 83 is shown in Fig. 13 and the functions have been indicated by legends, to correspond with those of Fig. 1.

Tracker sheet

The primary tracker sheet is an important article of manufacture, either as cut, or as adapted to be cut, for use with a tracker bar. The new sheet is provided with guide lines and indicia to facilitate location of the places where perforations are to be provided. The pattern of location of the openings may be widely varied for very simply and accurately controlling the most delicate and complicated timing and control and coordinating operations. By using greater or lesser lengths of tracker sheets and by more widely or more closely spacing the control openings and by moving the sheet at faster or slower rates across the tracker bar, there is given a potential range of control heretofore unknown in this art. The indicia and lines on the sheet indicate the time stage of the cycle and the character of the operation. Various signal circuits may be controlled by the tracker sheet to show the operator at a glance what stage of the operation has been reached, and all of these circuits can be primarily fluid-controlled by the use of the tracker sheet and its bar.

Now referring to Figs. 16, 16A, 16B and 16C, which illustrate parts of one and the same tracker sheet. The sheet illustrated represents a washing cycle which here, lasts about sixty minutes. The length of the sheets may be varied, but for the washing operation herein mentioned a tracker sheet, about ninety inches long and six inches wide is adequate, and very accurate timing can be obtained.

One of the great advantages in the use of a thin flexible sheet of paper as a moving timing control, is that any length of paper can be used, and that it is very cheap, and that it can be compactly rolled on spools. A big advantage is that a narrow sheet can be used, for example six inches wide and yet it can be of any desired length so as to be used for long or short operations such as commercial washing operations. Moreover, a single length of paper can have openings arranged therein to sequentially or even simultaneously, control two or more operations of different kinds. The sheets can also be laid out in any desired length.

A feature is, that the control openings 4 can be made all of the same size with a single type and size punching tool and that the openings can be made all of the same shape, preferably circular. A series of spaced circular openings do not weaken the sheet, as an elongated slot would, and better sealing relation between sheet and bar can be maintained when slots are not used and/or when the openings can be made small. The use of the same size and shape hole has a great advantage, and it is a feature herein that the openings may be so grouped as to obtain continuous action without the use of slot-like openings, which tend to allow breaking of the seal between sheet and bar.

The sheet herein shown, provides for a four-minute cold rinse period, a ten-minute first suds period, a nine-minute second suds period, an eight-minute third suds period, a nine-minute first rinse period, a seven-minute second rinse period, an eight-minute third rinse period, and a five-minute fourth rinse period.

The sheet is marked with lines 216, and 217 respectively extending lengthwise and crosswise, and certain of the cross lines 218 are made more prominent and extended beyond the lines 216 towards the edge of the sheet to indicate "minute" time intervals. On each side of the sheet is a longitudinal row of openings 220 which are adapted to be engaged by feeding pins 221 on the feeding spool 109 for driving the sheet. The "minute lines" 218 in this case intersect some of these openings 220. In this case twenty-five longitudinal lines 216 have been drawn. Each line corresponds in position with a passage 2 of the tracker bar 1. At intervals along the tracker sheet legends are provided in relation to the lines 216, to indicate the control function of the openings on that line in relation to the corresponding opening of the tracker bar. For example in this layout (referring to Fig. 16) the topmost longitudinal line 216 relates to the control for the starting motor of the washer. The next five lines relate to settings for the temperature regulator device. The next four relate to the varying amounts of water to be delivered to the washer. The next line relates to a signal which indicates that the water is running into the washer. The first longitudinal line at the bottom of the chart shown in Fig. 16 corresponds to the introduction of bluing, the next line to the introduction of bleach, the third line to introduction of sour, the fourth line to introduction of soap, the fifth line to introduction of steam, the sixth line indicates the dumping operation, the seventh line has to do with stopping the washer motor, and the eighth has to do with the stopping of the motion of tracker sheet itself, which in this instance automatically occurs at the end of the sixty-minute period, unless sooner stopped by manual operation of the valve 42, of Fig. 1. The minute marks are arranged in relation to the heavier minute lines 218.

Another feature of this invention which is related to the tracker sheet, is the scheme whereby continuous action can be obtained without the use of a slot. Referring to Fig. 17, which is an enlarged view showing the relations of a group of openings 4 in the tracker sheet to a passage 2 in the tracker bar 1. It will be noted that the spacing E between two consecutive tracker sheet openings 4 is less than the diameter F or dimension of a tracker bar opening 2, in direction of travel of the sheet. These openings 4 are therefore so spaced that the forward one of a pair never passes out of registration with an opening 2, until the next one comes into register. Thus continuous control action by means of the tracker bar and tracker sheet can be had, without the necessity for making an elongated slot and therefore weakening the sheet. This feature in addition to or in conjunction with the variation in venting rate of the diaphragm chamber of a unit to obtain continuous control, are features of the invention.

*Control of water supply*

Another phase of this invention relates to a device automatically operable, from a primary control station by means of the tracker bar and sheet, to control water supply means in a manner to cause delivery of water in selected quantities to the washer, and to automatically stop water delivery when the desired quantity has been delivered. I believe it entirely new to perform these functions automatically, and also to perform them by tracker sheet and bar control, and/or timing controlled by a tracker sheet and bar.

As has been previously described, water supply is controlled by the tracker bar and sheet through diaphragm valve 53, see Figs. 1 and 18. This valve is operated by low pressure applied to its diaphragm. When this valve is opened by tracker-sheet action as shown in Fig. 18, high pressure air is admitted from manifold 7 to the line 54, thence to line 55, past check valve 56 to line 57, thence to the diaphragm chamber of valve 58 which is then moved to vent at 162, the fluid in water-valve line 59 to permit the water control valves to automatically open to supply hot and cold water for mixing and delivery to the washer, by way of a water meter.

By means of the check valve 56 the pressure is also held in a vent line 60 connected with a vent valve generally indicated at 61. The valve operating element of this valve 61 is controlled in a novel manner, now to be described, to be opened to vent line 60, and release the diaphragm of valve 58, and move valve 175 to allow high pressure fluid to enter line 59 from manifold 27 to close and hold closed the hot and cold water valves. When water valve 53 is operated, pressure is also sent through line 63 to operate a temperature regulator resetting mechanism (a feature of this invention per se and also in conjunction with water meter action) to bring it to zero position, after which the temperature regulator mechanism is, by means of the tracker sheet control, again automatically set at another and proper position to regulate the temperature of the next charge of water delivered to the washer. Automatic control of the amount of water charge and/or automatic control of the temperature regulator is believed to be new in this art.

Referring now to Fig. 18 which is diagrammatic, and also to Figs. 19 to 22 inclusive. The cold water pipe is indicated at 225, the hot water pipe at 226. Each of these pipes is controlled by a valve of the same type, which opens automatically by means of a spring. Any suitable kind of valve may be used, including one that closes automatically. The cold water control valve is designated 227 and the hot water control valve 228. The cold water is delivered into a chamber 229 and the hot water into a chamber 230. From these chambers the water is delivered to a mixing valve indicated at 231. The water, after mixing, is delivered to operate a water meter generally indicated 232. The meter may be of any preferred structure. Mixing by means of movement of the valve 231 is controlled by a diaphragm 235 through a pipe connection 236 to the diaphragm chamber, which is later referred to in the description of the temperature regulator device and its setting means.

The meter 232 may be of any preferred type. The meter operates a gear wheel 238, through a train of reduction gearing. One means by which this gear wheel can be operated by the meter is best shown in Figs. 19 to 21. The meter shaft 239 has threads 240. Meshing with these threads is a worm gear indicated at 241 in Fig. 21, and also shown in dotted lines in Fig. 20. This worm gear is carried by a shaft 242, which in turn carries a spur gear 243, which meshes with another spur gear 244, suitably secured to shaft 246. The gearing thus far described merely constitutes a reduction gearing and the shaft 246 is rotated when the meter is rotated. The degree of rotation of shaft 246 corresponds to a predetermined quantity of water delivered through the meter 232. A certain number of rotations of this shaft will, therefore, correspond to a certain quantity of water going through the meter. The gear 238

(see Fig. 20) is mounted on a sleeve 250, which sleeve has a disk 251 which is pressed into slip-frictional engagement with disk 252 fixed to the shaft 246 by a cross pin. The spring pressure for this slip-frictional contact is provided by spring 253. The sleeve 250 is rotatable on the sleeve hub of disk 252.

Now referring to Fig. 19. Two gear racks respectively designated 256, 257 are slidably mounted in casing 258 which also encloses a gear 238, and the slip-friction disks. The racks mesh with opposite sides of the gear 238, and therefore the racks move in opposite directions at the same speed and equal distances when the gear 238 is rotated. Dependently attached to the casing 258 is a tubular extension 259, and attached to the bottom of this tubular extension is a plunger block 260. In this block are arranged five piston plungers, all substantially alike in structure and four of which are designated 261. Each plunger is projectable above the top of the block from an initial position flush with the top when pressure is applied through a corresponding pipe 263, also see Fig. 1A. These pipes are connected to corresponding valves shown in Fig. 1, which have heretofore been generally designated 8 but which are now specifically designated 264. In this instance there are four of these valves one for each piston, and water level.

Referring to the cross-section Fig. 22, it will be noted that four of the pistons only are adapted to engage or to be engaged by a foot piece 267 at the bottom of the gear rack rod 256. The fifth piston 268 is engaged only by the foot piece 269 of the rack rod 257. The foot piece 267 is also adapted to engage the top of a pin 270 to open a venting valve 271 for the line 60 (see also Fig. 18), when metering action has brought foot 267 to its lowermost position, which corresponds to the end of the delivery of a predetermined amount of water for the washer. The unseating of the valve 271 vents the line 60, releases the pressure in the diaphragm chamber of valve 58, allows valve 175 to open to obtain pressure through pipe 59, to force valves 227 and 228 to closed position to shut off the water.

Setting of the device, for control by the meter is selectively accomplished by stops 275. These stops are set at various desired positions (see Figs. 19 and 22). For example, for the first water level the stop 275 may be at the position shown, to limit upward motion of a plunger 261, to correspondingly move rack 256, and the gear 238 which has the slip friction connection with the meter. Another stop for the second water level may be set at a higher level, than the first, a third at a higher level than the second, and a fourth at a higher level than the third. The stops 275 can be so set that a greater amount of water is first delivered, a lesser amount is then delivered for the second level, a still lesser amount delivered for the third level and a greater amount delivered for the fourth level than has been previously delivered. Ordinarily one plunger 261 is set at a time and each is set after a previously set plunger has been brought to initial position by meter action.

As any one of the selected elements 161 is moved to its level, the rod 255 is moved, the gear 238 is rotated against the action of the slip-friction of the disks 251, 252. As water flows through the meter the gear 238 is rotated in counter-clockwise direction and rod 256 is moved downwardly until its foot 267 has moved any piston 261 to its initial lowermost position and until the foot 267 has engaged and moved rod 270 and unseated the valve 271 to vent line 60, to shut off the water.

Any one or all of the four pistons 161 may be moved downwardly to initial positions independently of metering action by means of the piston 268. This piston is operated from the manual reset valve 280 (see Fig. 1) mounted on the lower manifold 27. This valve is connected by the pipe 277 with the piston chamber for the piston 268. When piston 268 is operated it engages the foot 269 of the rack rod 257, moves it upwardly and correspondingly moves rod 256 downwardly until one or more of the pistons 261 have been moved to their lowermost or initial positions and have shut off the water as a result of venting line 60. The foot 269 passes through a vertical slot in the tubular member 259 as shown in Figs. 19 and 22. The foot is arranged at the outside of the tube 259 and can be directly manually operated, in emergency by an attendant at the washer or other machine being controlled.

I believe that the control by the meter to shut off the water is entirely new, and also believe it is entirely new to operate a device of this kind by what may be called remote control, and also new to operate such a device by tracker bar and sheet as herein described. So far as I am aware, there has never been any automatic control or remote control associated with a washing machine for very accurately measuring the amount of water to be delivered, and capable of being operated selectively to measure and deliver different quantities of water. So far as I am aware, all of prior devices are set by hand at the instrument itself and none is controlled remotely or automatically.

Referring to Fig. 18, another feature of this invention includes the operation of an automatic self-closing (instead of an automatic self-opening) water valve (see Fig. 30) by a combination of elements including the valve 53, check valve 56 and vent line 60 which has a branch for operating the water valves to hold them open for the desired length of time. Valve 58 is in this case omitted. In this instance valve 58 and its pipe connections are omitted. When valve 53 is operated through the tracker sheet control, a high pressure shot of fluid passes from the manifold 7 past the valve 167 to the line 54, line 55 past the check valve 56, line 57 to line 60, thence to line 60A (dotted) to water valves of the type shown in Fig. 30, to hold them open. The pressure in lines 60 and 60A is held by the check valve, or continuous action by the tracker sheet may be had by a plurality of openings (instead of a single opening) in the tracker sheet, or by venting adjustment, to hold the water valves open as long as water is desired. This manner of operation illustrates how flexible the primary control of fluid by means of tracker bar and sheet is, in the matter of adaptation to various types or other fluid-operable devices to be controlled.

*Temperature-regulated control of delivered water*

Another new feature of this invention relates to means for automatically selectively setting a temperature-regulating device, the function of which is to control mixing valve 231 so that water is mixed and delivered to the washer at a selected and proper temperature. Automatic and/or remote control are believed to be new.

This automatic selective device is illustrated in Figs. 23–27. The use of pistons and piston-stops for selective setting of the regulator, is somewhat similar to that described for meter control of the quantity of water delivered. First referring to Fig. 23. The cold and hot water pipes are respectively indicated at 225 and 226. The mixing valve is shown at 231 and the diaphragm controlling it is shown at 235. The regulator which is to be set includes a gear wheel 290 (see also Fig. 24). This gear wheel when turned adjusts any suitable type of heat-regulating device or thermostat, for its appropriate action in control of the mixing valve. These devices are ordinarily adjusted manually, by a knob such as shown at 291. This knob has a pointer 292 which moves over a scale 293. In this case the regulator can be set either manually or automatically, and automatic setting is a feature of my invention.

The gear 290 is attached to a rotatable shaft 295 which has a circular fulcrum plate 296. The terminal of the shaft 295 is threaded as at 297 into an inner thermal element 298, which element is secured at its outer end as shown to a second and outer thermal element 299, which is contacted by the water delivered from the meter. The second thermal element is fixed at its opposite end as at 300, to a casing. Rotation of shaft 295 by gear 290 moves the fulcrum plate inwardly or outwardly. The thermal element 299 extends into a pipe 301 which delivers water to the washer. A connection 302 is diagrammatically shown between the pipe 301 and a casing 303 to which water from the meter (not shown in this figure) is delivered. One type of meter is somewhat diagrammatically illustrated in Fig. 18. A lever 306 is pivoted as at 307 and has a knife edge 308 engaging the fulcrum disk 296. A spring 309 presses the knife edge against the disk. When the shaft is rotated to adjust it axially (permitted by thread 297), the fulcrum point is changed. When the fulcrum point is changed a pin 312 moves a ball valve 313 against the action of the spring 314 to exhaust a greater or lesser amount of fluid at the vent opening 315. The amount of venting controls the amount of pressure on the diaphragm 235, and therefore the motion and final position of the mixing valve 231.

The pressure fluid is provided by supply pipe 22 (see Fig. 1A). This fluid is delivered past an adjustable needle valve 317 through pipe 319 to pipe 236 for operation of the diaphragm 235. I do not claim the regulator construction per se as shown, but only as means functionally capable of use in various combinations with other elements, in the automatic and selective control of water supply and water temperature regulation. I also claim the means now to be described which can automatically, adjustably, and/or selectively rotate the wheel 290, or move any equivalent device, to set any preferred type of regulator, for controlling a mixing valve.

Now referring to Figs. 24–27, inclusive. A casing 320 houses the gear 290 and provides guides for a pair of rack bars 321, 322. The bar 321 has a foot 325. Attached to the casing 320 is a tube 326 vertically slotted as at 327 to provide slideways for adjustable stops 328 adapted to be clamped at any desired position. In this instance there are five slots and five stops and the tubular casing 326 is exteriorly marked as shown in Fig. 24, with various temperature indications. Attached to the bottom of the tube 326 is a piston block 330 having slidable in passages therein five pistons 332 corresponding in number to the five temperature settings shown in Fig. 1 as first, second, third, fourth and fifth temperatures. The fluid-operable valves on manifold 6, which control these pistons 332 are indicated 333. Each valve is connected by a pipe 335 for the operation of a piston 332.

In a manner previously described for the control of the amount of delivered water, any one of these pistons 332 can be raised and when raised its upward motion is limited by one of the stops 328. As it rises it engages the foot 325 and moves the rod 321, thus rotating the gear in clockwise direction, in Fig. 26. As the rod 321 moves upwardly the rod 322 moves downwardly. The lower end of rod 322 is received by a resetting cylinder 335, the piston 336 of which is moved by fluid received through line 63 (see Figs. 18 and 1 and 1A) when the diaphragm of the water control valve is momentarily operated under control of the tracker sheet and bar. When air pressure is introduced into the cylinder 335 the piston 336 moves rod 322 upwardly, the rod 321 is moved downwardly and will also move downwardly, to initial position any piston 332 which may be in an upper position. Thus the regulator is brought to zero setting, ready to be again selectively set at another regulating position by one of the pistons 332 acting on rod 321.

In this embodiment, in the control of a washer, the resetting takes place after the proper amount of water at the right temperature has been delivered, thus conditioning any one of the elements 332 to be moved upwardly to correspondingly move the rod 322 to correspondingly set the thermostat regulator to operate the mixing valve 231 to deliver the next charge of water at another selected or desired temperature. The openings in the tracker sheet determine the sequence and the times of operations.

I believe it entirely new to provide any means for selectively automatically controlling a temperature regulator in the manner described, and entirely new, of course, to control such a regulator by means of a tracker bar and sheet as herein disclosed, and/or by means of any tracker sheet and tracker bar device.

In Fig. 28 is illustrated, on a small scale and somewhat diagrammatically, the rear view of the washing machine 201, with such devices represented as are used herein for a washing operation. Those devices are also represented in Fig. 1A.

In Fig. 29 there has been shown somewhat diagrammatically a form of fluid-operable dump valve structure generally designated 13, which is suitable for operation by fluid controlled by the tracker bar and sheet either directly, or indirectly through a low pressure diaphragm-operated valve. The valve 340 of this dump structure is raised by piston 341, by means of fluid entering through pipe 342 controlled by the dump valve of the manifold 6 as shown in Fig. 1, into the piston cylinder. There is also shown in Fig. 29 a suitable type of steam valve structure generally designated 14, including a normally spring-closed valve operated by a piston 343. The fluid flow to the piston chamber 344 is through pipe 345 controlled by the low pressure valve on the manifold 7 of Fig. 1, by means of the tracker bar and sheet herein. Valves 13 and 14 must be opened for a predetermined period of time, which is very accurately controlled by groups of openings in the tracker sheet.

In Fig. 30 a type of fluid-operable valve is shown which can be used for the control of the water supply (see Fig. 18) or for control of the supply tanks 17, 18, 19, 20 and for the soap line 21. Each of these tanks delivers to one and the same pipe (not shown) which leads to the washer. Each spring-closed valve has a piston 351 in a suitable piston chamber. The pressure supply to any chamber is through a pipe 352 which connects with the corresponding soap, sour, blue and bleach control valves, the first two of which are mounted on the manifold 6 and the last two of which are mounted on the manifold 7. The valve for the soap supply pipe, and the valve for the supply tank are connected with one and the same pipe 352. It will be understood that each valve structure above referred to is applied to a pipe which leads from the tank to a pipe (not shown) which delivers to the washer.

The continuous action for delivering the proper amount of chemical or for holding the dump valve open for a sufficient length of time for the water to fully drain from the washer, will be controlled either by close spacing of openings of the tracker sheet or by the adjustable venting means 153 and 154 as has been previously described. The same continuous action will be required for holding the steam valve open long enough to introduce the proper amount of steam. The same continuous action is required for holding the air-operated valves of the supply tanks open while the proper amount of liquid runs into the washer. In regard to the delivering of exactly the proper amount of fluid from the supply tanks to the washer, this is very accurately timed by the tracker sheet. The amount delivered from the tanks is measured by the time that any valve is open and therefore it is quite important that this time of opening and closing be controlled, to seconds, if the delivery of accurate amounts is to me had. Both the method of control by the tracker sheet openings alone, and control by tracker sheet openings in relation to variable venting means, are claimed.

Suction operation

While I have found it best to use air pressure and to enclose the tracker bar and its motor-moved and timed control sheet in a pressure chamber, because compressed air is ordinarily used for operating various devices associated with washing machines, yet it is believed to be new to use a bar and sheet in relation to entry of air at atmospheric pressure, by creating a suction in some part of the system, which suction will draw air through the sheet and tracker bar openings when registration occurs. In this case it is unnecessary to enclose the rolled sheet and tracker bar in a sealed chamber.

A feature is, that the structure of the diaphragm unit lends itself to tracker sheet control of either pressure or suction, and this dual control is related to the difference in size of the two openings both of which communicate with the diaphragm chamber. As heretofore described, a relay or intermediate valve or switch-operating mechanism has been held in its initial position by means of a spring and with the diaphragms engaged. And the diaphragms have been moved by pressure fluid, the introduction of which occurs when openings of the tracker bar and sheet register. However, the valve or other mechanism may be held in its initial position by means of vacuum or suction action and the vacuum may be broken by admission of air at atmospheric pressure through the registered openings of tracker bar and sheet, to release the diaphragms for movement by a spring from its initial to its final control position. Fig. 31 shows one initially open valve type of valve mechanism, in which the valve is held by suction or vacuum, and against the action of a spring. The initial position of the valve may be, a closed position. In either case, the valve is held in an initial position by a vacuum and moves to an opposite control position when the vacuum is annulled by introduction of atmospheric air through the registered openings of the tracker sheet and bar, at a rate greater than it can be sucked from the chamber.

Referring to Fig. 31. In this instance as in the preferred form, a tracker bar passage 2 is connected by a pipe 151 with chamber 152 of a diaphragm unit. In this case what was originally a pressure venting opening 153 is now connected by pipe 360 with a vacuum or suction line 361. When there is no registration between an opening of the tracker sheet and tracker bar, the vacuum acts to maintain the diaphragms, one against the other, and against the action of spring 362, which spring is stronger than the spring 177.

The tracker sheet normally closes the tracker bar passages against entry of air at atmospheric pressure. When registration occurs between tracker sheet and bar openings the diaphragm moves to the right to close the high pressure line. The opening 153 must be large enough to allow air to fill the diaphragm chamber faster than the vacuum exhaust line will exhaust the air therefrom. This will give the same lag in operation as is obtained under pressure when using the restricted vent opening.

The principle of all fluid primary control is illustrated both for pressure and suction. In both cases the primary fluid control is through a vented diaphragm chamber or equivalent device, as a relay or intermediate low pressure-operable device which in turn controls high pressure fluid for direct operation of the devices at the washer or at any machine.

In case of a normally closed valve, like that shown in Fig. 31, it is held closed by vacuum or suction and with the diaphragms together. When the vacuum is broken by the admission of air through the tracker sheet and bar openings, the stronger spring moves the valve against the action of the weaker spring to open position, and the valve is so held as long as tracker bar and sheet openings are in register. When the openings of the sheet again assume nonregistering position, there is a lag while the vacuum is being built up sufficiently to move the diaphragm against the action of the stronger spring, again to a position against the other diaphragm, the parts being held in this position until registration between the openings of the tracker sheet and bar again occur.

The use of fluid for primary control can obtain dependable control of electrical devices, where the washer or other mechanism to be controlled, is already equipped with them. The primary fluid control of electric switches is much more practicable than primary electrical control of switches by means of electrical contacts or of a relay circuit or of a solenoid. The use of low pressure fluid-controlled pilots, which in turn control devices which can furnish adequate power, gives a very dependable control.

Another and important feature of this invention relates to the use of an endless tracker sheet. The use of such an endless sheet has decided advantages when short sheets are suitable, but it will be understood that provision for using long endless sheets can be made. The means for driving and timing the endless sheet is substantially the same as heretofore shown.

Referring to Fig. 32 which is somewhat diagrammatic, and in which the enclosing casing has been omitted. The tracker bar is indicated at 1, and a passage in it is designated 2. The tracker bar is stationary. Numeral 365 indicates one of two plates which correspond to the plates 87 and 88 previously described. Mounted between these plates is a drive roll designated 366. Three idler rolls or spools are respectively designated 367, 368 and 369.

As shown, the tracker sheet 5 is properly engaged with these rolls. The pins of the drive roll 366 and the openings in the margins of the endless tracker sheet cooperate as previously described, to feed the sheet and hold it tautly and sealingly against the tracker bar. The drive motor indicated at 371 is mounted on plate 365, and has a pinion 372 meshing with an intermediate pinion 373 which in turn meshes with the drive gear 374 for the drive roll 366.

The plates are suitably held together by crossbraces held by screws 378. The sheet is made endless by detachably securing its ends in the manner shown at 380. Any suitable means for detachably fastening the ends may be used, and servicing is so managed that the two ends are brought to a position between the lower drum or spool 637 and the tracker bar 1. Thus, the ends are in a convenient position to be secured, or to be separated if another sheet is to be substituted. At the end of the timing cycle the attached ends again assume the position shown.

In this case the pipes 79 (only one shown) which connect with the fluid-operable devices or with the manifolds, pass horizontally or laterally through a vertical side wall of the casing (not shown) instead of through the bottom wall, as previously described.

The endless tracker sheet has lines and indicia, as previously described, and after the sheet has been connected with its driving and supporting mechanism as set forth, the motor can be manually started, as heretofore mentioned. At the end of the cycle the motor will be automatically stopped in the same manner as previously described, and then all that is necessary for starting another cycle is to press the starting button. The arrangement of the openings of the tracker sheet will, as heretofore described, be in accordance with the desired pattern of operation.

The endless sheet may for some uses be made relatively short, but even as shortened, its total circumference or endless length is such as will permit of a spacing of the openings to obtain a degree of accuracy in timing not obtainable by the use of any device known to me, which depends on openings or upon the lengths of openings for timing. Of course, it is not necessary in this invention to depend on the lengths of openings for timings. All the openings as shown herein are of the same size. The spacing of these openings is an important feature and the endless sheet, whether long or short, provides a length which allows room for proper spacing, to obtain accurate timing. This spacing of openings is also important in its relation to a venting rate, as has been previously described.

For a short sheet three idler rolls and one drive roll are used herein. Two drive rolls can be used. Suitable mounting for long endless sheets can be provided by using multiple idler rolls and by forming a dependent loop. It will be understood that with certain modifications, the supporting and drive rolls and motor for the endless sheet, may be mounted on plates which can be moved outwardly to a loading position. All that is necessary is, that the pipes which connect with the tracker bar passages be so arranged as to allow for this outward movement. The tracker bar remains stationary. Such motion for loading is unnecessary when suction is used instead of a pressure chamber, and even when a pressure chamber is used, reloading is only required when a tracker sheet, which is cut for a different formula, is to be substituted.

Reverting to the rewinding mechanism for the tracker sheet. Shaft 116 is provided with a knob 117 by which the takeup spool 106 can be turned by hand, independently of its driving connection with the motor through the gearing 102, 101, 100. The slip connection 115 allows this independent operation. Thus, while the frame constituted by the elements 87, 88 is in the dot-and-dash line position of Fig. 3, and by the use of the knob 94, the sheet can be wound or adjusted backwardly. By the use of the knob 117 it can be wound or adjusted forwardly.

Clutch holdout element 127 (see Figs. 2, 3 and 5) has a lateral terminal projection 127A which engages with the casing 126A (as the frame is again moved to its position of Fig. 3) to obtain automatic release of the lower part 128 of the clutch lever, to allow it to be moved by the spring 120 to clutch-in position. This automatic release, of course, occurs after the part 128 has assumed the position of Fig. 5 between the element 124, and the terminal button of the stem which is carried by the push button 126.

The word "sheet," as used herein for the tracker sheet, is meant to connote any suitable kind of flexible sheet material including narrow sheet material such as tape. A tape may be provided with a single row of openings which register with a passage in the tracker member to time an operation. Very small circular openings, for example one-sixteenth of an inch in diameter, may be used in either sheet or tape. The openings in the tracker bar may be, for example, three-sixteenths of an inch between centers.

Such a degree of compactness in structure and in accuracy of results, as are obtained herein, can never be approached by the use of electrical contacts operating through slots of different lengths or through openings of different sizes or by the use of slotted disks or cylinders. Moreover, the lengths of the sheets and their rate of motion may herein be varied widely to provide periods of time control ranging from a few seconds to twenty-four hours or more. In conjunction with the use of a synchronous motor, change gear means may be provided whereby a number of different rates of movement of the sheet may be had.

The range as to the number of devices which can be time-controlled by a single sheet is large, and includes a single row of openings in a tape or a wider sheet having from two to sixty rows of openings. The openings may be of such size that five rows to the inch can be provided and thus twenty-five rows can be had in a sheet which is only six inches wide. Another advantage is that even though a fraction of the total area of a tracker sheet opening registers with its passage, yet sufficient fluid is admitted to cause the proper operation of the corresponding device.

The sheet can be manually reset by means of the setting knobs provided for the supply and receiving rolls, either in a forward or in a rearward direction (after the clutch is released). Another advantage is that registration of openings and passages is assured by the use of a marginal row of feeding openings with which radial pins on the feeding roll cooperate. The flanged spools on which the sheet is mounted, either in its rewindable form or in its band-like form, also act as guides to assure registration of the openings of the rows of the sheet with the corresponding passages of the tracker bar.

The forward end of the tracker sheet or tape is positively quickly connected to the takeup or receiving spool by means of an adhesive strip or tape (not shown) of the pressure-connecting type. This is a simple and inexpensive device, and the tape can be stripped off and reused. Such adhesive tape can also be used for connecting the ends of a sheet to give to it an endless band-like form. A convenient connection for these ends is one of the snap-fastener type shown, which permits of making a connection so that the sheet is given a taut condition to assure pressure sealing against the tracker bar. The taut condition for obtaining sealing may be accomplished by other suitable means.

I claim as my invention:

1. A device of the class described comprising, a washing cylinder having an electric driving motor and a fluid-operable dump means for the cylinder, separate means each fluid-operable for delivering soap, bleach, sour, blue and steam to the cylinder, fluid-operable means for selectively delivering water in predetermined amounts to the cylinder, fluid-operable means for selectively regulating the temperature of the delivered water, a pressure manifold having separate pressure connections to each of the aforesaid fluid-operable means, a fluid-operable means for controlling each connection, means for manually controlling each fluid-operable means independently of fluid control, a pressure supply line for the manifold controlled by fluid-operable means, a fluid-pressure chamber having therein a tracker bar having openings connected for separately supplying pressure for the operation of each of the last-mentioned fluid-operable connection-controlling means, and a driven tracker sheet in the chamber having openings cooperable with the openings of the tracker bar for admitting pressure for operating the said connection-controlling means in a manner and in a sequence to cause the first-mentioned fluid-operable means to perform a washing operation.

2. A device of the class described comprising, a washing cylinder having an electric driving motor and a fluid-operable dump means for the cylinder, separate means each fluid-operable for delivering soap, bleach, sour, blue and steam to the cylinder, fluid-operable means for selectively delivering water in predetermined amounts to the cylinder, fluid-operable means for selectively regulating the temperature of the delivered water, a pressure manifold having separate pressure connections to each of the aforesaid fluid-operable means, a fluid-operable means for controlling each connection, a pressure supply line for the manifold controlled by fluid-operable means, a fluid-pressure chamber having therein a tracker bar having openings connected for separately supplying pressure for the operation of each of the last-mentioned fluid-operable connection-controlling means, and a driven tracker sheet in the chamber having openings cooperable with the openings of the tracker bar for admitting pressure for operating the said connection-controlling means in a manner and in a sequence to cause the first-mentioned fluid-operable means to perform a washing operation.

3. A device of the class described comprising, a washing cylinder having an electric driving motor and a fluid-operable dump means for the cylinder, separate means each fluid-operable for delivering soap, bleach, sour, blue and steam to the cylinder, fluid-operable means for selectively delivering water in predetermined amounts to the cylinder, fluid-operable means for selectively regulating the temperature of the delivered water, a pressure manifold having separate pressure connections to each of the aforesaid fluid-operable means, a fluid-operable means for controlling each connection, a pressure supply line for the manifold controlled by fluid-operable means, a fluid-pressure chamber having therein a tracker bar having openings connected for separately supplying pressure for the operation of each of the last-mentioned fluid-operable connection-controlling means, a driven tracker sheet in the chamber having openings cooperable with the openings of the tracker bar for admitting pressure for operating the said connection-controlling means in a manner and in a sequence to cause the first-mentioned fluid-operable devices to perform a washing operation, means for driving said sheet including a clutch which when open permits rewinding of the tracker sheet, means operated by the clutch when it opens to operate the fluid-operated means of the manifold supply line to cut off the supply to the manifold, an electrical circuit for the cylinder motor, including a manually-operable starting switch, and a fluid-operable stopping switch having a pressure connection with one of the openings of the tracker bar, which opening is controlled by the tracker sheet, an electrical circuit for the tracker sheet motor having a manual starting switch, and a fluid-operable stopping switch having fluid connection with an opening in the tracker bar and controlled by tracker sheet, and means operable by water on its way to the cylinder for independently automatically cutting off the water supply after a predetermined amount has been delivered to the cylinder.

4. A device of the class described comprising, a washing machine having a cylinder and a washer motor for the cylinder and means for controlling the motor, fluid-operable means for draining the cylinder, fluid-operable means for controlling delivery of water to the machine, fluid-operable means for measuring the amount of delivered water, fluid-operable means for regulating the temperature of the delivered water, a manifold having fluid connections with the aforesaid fluid-operable means, fluid pressure-operable valve devices associated with said manifold to control the flow of fluid from the manifold for the operation of the aforesaid fluid-operable devices, a tracker bar having passages each connected to one of said fluid pressure-operable valve devices, a tracker sheet movable against the bar in sealing contact therewith, means for moving the sheet at a timed rate, said sheet having rows of openings adapted to register with corresponding tracker bar passages as the sheet is moved, the openings of the sheet being so disposed as to control said fluid-operable valves in a manner to correspondingly control the flow from the manifold to the said fluid-operable means at the washer in a manner to carry out a washing operation, and a source of fluid pressure for entry through the openings and passages of the tracker bar and sheet.

5. A device of the class described comprising a washing receptacle to be charged with a flowable substance, a supply source of a substance the flow of which to the receptacle is to be controlled, means connecting said source with said receptacle, means for controlling flow through said connecting means to said receptacle, a tracker bar having an opening, a source of fluid under pressure, fluid connections between said opening and said controlling means adapted when fluid is admitted thereto to operate said controlling means, a tracker sheet movable against the bar, and means for moving the sheet at a predetermined rate, said sheet having openings adapted to register with the openings of the bar in a manner to admit fluid from said fluid-pressure source into said connections for a timed operation of said control means to respectively start and stop flow of said substance from said source, to the receptacle.

6. A device of the class described comprising, a washing receptacle, means for supplying liquid to the receptacle including. means for mixing hot and cold liquid before delivery to the receptacle, thermostatic means controlling the mixing means and adjustable to vary the mixing action of said mixing means to obtain a mixture of liquid which has the desired temperature, means for selectively adjusting the thermostatic means, and means controlling said selective adjusting means, including a tracker bar having openings in fluid connection with said selective adjusting means, and a sheet moving across the bar and having openings which when registered with the openings of the bar cause operation of the selective adjusting means in a predetermined manner, and a source of fluid pressure for entry through the said openings of the bar and sheet.

7. A device of the class described comprising, a washing receptacle, means for supplying liquid to the receptacle including, hot and cold liquid supply pipes and fluid-operated valves one controlling liquid flow in each pipe, means adapted to mix liquid delivered through the pipes, thermostatic means responsive to the temperature of the mixed liquid and adapted to control the mixing means in a manner to obtain liquid at the desired temperature, means for selectively adjusting said thermostatic means by movement from initial position to a temperature-set position and return movement to said initial position, a liquid meter operable by the mixed and tempered liquid, an element and means by which it is adapted to be positively driven by the meter but by which it is allowed movement independently of the meter from an initial to a set position from which set position the meter returns it to the initial position, means for selectively setting said element at different positions from the initial position, means operable by said element when it arrives at initial position for operating the liquid control valves to close them, a tracker bar having passages, means connecting the passages respectively for fluid operation of said liquid controlling valve and of both selective setting means, a sheet movable against the tracker bar and having openings registerable with the passages of the bar, the said openings and passages being so related as to operate the said setting means in a manner to cause delivery of selected measured quantities of liquid at various selected temperatures and in a predetermined sequence, and a source of fluid under pressure adapted to pass through said openings and passages when registered.

8. A device of the class described comprising, a washing receptacle adapted to be charged with a flowable substance, means for controlling flow of the substance to said receptacle including, a pressure line, a structure having a pressure chamber formed by first and second diaphragms, both movable, a control member movable by the first diaphragm to control pressure through the line, a tracker bar having a pressure passage in communication with the chamber, a tracker sheet movable across but normally sealingly closing the passage, said sheet having openings adapted to register with the passage of the bar to automatically admit fluid under pressure between the diaphragm, a source of fluid pressure for entry into the registered openings and passage, and a manually operable button adapted to act on the second diaphragm to cause it to move the first diaphragm independently of its movement by introduction of fluid between the diaphragms, whereby control of said flowable substance can be manually prolonged.

9. A device of the class described comprising, a washing cylinder and a plurality of devices associated therewith for performing a washing operation, each device being fluid-operable, and a control unit for said devices comprising, a pressure chamber, and a chamber having a manifold therein, a fluid pressure supply pipe for the manifold, a plurality of pressure delivery pipes leading from the manifold to the outside of the unit and connected with said fluid-operable devices, fluid-operable valve devices on the manifold separately controlling pressure from the manifold to each of said delivery pipes, a tracker bar in the pressure chamber having openings each connected by a pipe for the fluid pressure operation of one of the fluid-operable valve devices, a tracker sheet having openings adapted to register with the openings of the bar to admit pressure thereto when the openings register, means for driving the tracker sheet, means for operating each fluid-operable valve device independently of its fluid pressure operation and in part accessible from the outside of the unit, and a pipe through which fluid pressure is delivered to the pressure chamber.

10. A device of the class described comprising, a washing machine and a plurality of devices associated therewith for performing a washing operation, each device being fluid-operable, and a control unit for said devices comprising, a pressure chamber, and a chamber having a manifold therein, a fluid pressure supply pipe for the manifold, a plurality of pressure delivery pipes leading from the manifold to the outside of the unit and connected with said fluid-operable devices, fluid-operable valve devices on the manifold separately controlling pressure from the manifold to each of said delivery pipes, a tracker bar in the pressure chamber having openings each connected by a pipe for the fluid pressure operation of one of the fluid-operable valve devices, a tracker sheet having openings adapted to register with the openings of the bar to admit pressure thereto when the openings register, means for winding the tracker sheet, means for rewinding the tracker sheet including a clutch, a pipe through which fluid pressure is delivered to the pressure chamber, and means operated by the clutch for shutting off the pressure in the supply pipe for the manifold as said clutch opens to allow rewinding.

11. A device of the class described comprising, a washing machine and a fluid-operable device associated therewith to assist in a washing operation including, first and second manifolds, a first high pressure air line delivering to the first manifold, a second high pressure line leading from the first to a second manifold, said second manifold having a delivery line leading from it to said fluid-operable device, a first low pressure air-operable valve device for controlling air flow from the first manifold to the second line by stopping the flow to and venting the pressure in said second line and second manifold, a second low pressure-operable device functionally similar to the first device for controlling air flow from said second manifold to its delivery line, a pressure chamber, means for introducing air under low pressure into the chamber, a tracker bar in the chamber having a passage, a tracker sheet in sliding engagement with the bar and having openings adapted to register with the passage of the bar, means for driving and rewinding the sheet including a clutch, an air line connecting the chamber for operating said first low-pressure operable valve device, a valve in said line controlling entry of air from the pressure chamber thereinto, means by which the clutch opens the valve as the clutch is disengaged, and another air line connecting the passage of the bar for operating the second low pressure-operable device, whereby when the clutch is opened delivery of high pressure air from said first manifold is interrupted and the second manifold is vented and high-pressure air operation of the device to be operated is prevented during rewinding of the tracker sheet.

12. A device of the class described comprising, a washing receptacle to be charged with flowable substance, first means operable for selectively measuring and delivering different quantities of flowable substance to said receptacle, second means operable to cause removal of the charge from the receptacle, a tracker bar having openings, separate fluid-operable means for controlling the first and second means including fluid connections with said bar openings, and a sheet movable across the bar and having openings registerable with the openings of the bar to admit fluid to the bar openings, the arrangement of the sheet openings being such that registration of certain openings first causes selective operation of the first means and delivery of a selected amount of substance to the receptacle, and then after a timed interval the registration of other openings to operate the second means to cause removal of the charge from the receptacle.

13. A device of the class described comprising, a washing machine and a plurality of air pressure operable devices associated with said machine for carrying out a washing operation, a manifold and separate air connections from the manifold to each air pressure operable device, air pressure operable valves on the manifold each controlling air flow from the manifold through one of said connections, a control chamber having therein a tracker bar having openings each connected to deliver air under pressure to one of said valves on the manifold, a flexible sheet of material engaged with the bar and having openings adapted to register with the bar openings in a sequence to operate said valves to perform a washing operation, a source of low pressure fluid for said chamber for entry into said bar openings, a high pressure source of fluid delivering to said manifold and means for obtaining timed motion of the said sheet.

14. A device comprising a washing machine, means for supplying liquid to the machine in measured quantities, including a liquid meter, conduit means for supplying liquid to the meter and washing machine, a first fluid-operable valve in said conduit means controlling liquid supply to the meter, a second fluid-operable valve for controlling fluid for operating the first valve, a third fluid-operable valve for controlling fluid for operating the second valve, and means operable by the meter after a predetermined amount of liquid has passed through it for annulling the controlling action of the third valve to shut off liquid supply to the meter and therefore to the washing machine, a pressure chamber having a tracker bar therein having a passage, a pipe connecting said passage with the third valve for supplying fluid for operating it, a source of fluid pressure for said chamber, and a movable tracker sheet having an opening adapted to register with the bar passage to admit fluid to said pipe.

15. A device of the class described comprising, a washing machine and a plurality of air-operable devices associated with the machine for carrying out a washing operation, a primary sequence control-unit comprising a casing having first and second chambers, the first being a low pressure air chamber and having therein a tracker bar having openings and a tracker sheet having openings registerable with those of the bar to admit low pressure air to the bar openings, means for moving and for timing the movement of the sheet across the bar, means for delivering low pressure air to the first chamber, said second chamber having therein a manifold, conduits for separately delivering high pressure air from the manifold to each of said air-operable devices, means for supplying high pressure air to the manifold, air-operable valves on the manifold one for each conduit for controlling delivery of air from the manifold to the corresponding conduit, and pipes each connecting an opening of the tracker bar with one of said valves to open the valve when low pressure air is admitted through the bar.

16. A device of the class described comprising, a washing machine and fluid-operable devices associated therewith respectively for supplying water thereto and for regulating the temperature of the water to be delivered, each device being selectively operable by fluid-pressure separately delivered through each of a set of conduits, a first pressure supply manifold connected to deliver pressure to one set of conduits, a second manifold connected to deliver pressure to the other set of conduits, a pressure supply line for the manifolds, fluid pressure-operable valves on each manifold one for each conduit of each set, a tracker bar having openings, a conduit connection between each bar opening and one of said valves, a tracker sheet having openings controlling entry of pressure fluid into said tracker bar openings, and means for delivering pressure fluid for entry into said bar openings.

17. A device of the class described comprising, a washing machine and a plurality of fluid-operable devices associated therewith for assisting in carrying out a washing operation, said devices being operable by fluid pressure separately delivered through each of a set of conduits, a pressure supply manifold, a pressure supply line for device-operating pressure fluid for the manifold, fluid pressure-operable valves on the manifold one for each conduit of the set, to control pressure from the manifold to said devices associated with the machine, a tracker bar having openings, a conduit connection for valve-operating pressure fluid between each opening and one of said valves, a tracker sheet having openings controlling entry of pressure fluid into said tracker bar openings, and means for delivering pressure fluid for entry into said bar openings.

18. A device of the class described comprising, a washing machine and a fluid-operable device associated with the machine for carrying out part of a washing operation, a fluid pressure supply line for the fluid-operable device, a fluid-operable valve in the supply line having a chamber in which pressure is generated to open the valve, means to close the valve when pressure in the chamber is released, automatically-operable venting means adjustable to release the pressure in the chamber at variable rates, a tracker bar having an opening, a pipe connecting the opening with the pressure chamber, a tracker sheet having an opening controlling entry of fluid through the bar opening, and means for delivering pressure fluid for entry through the registered openings of sheet and bar.

19. A device of the class described comprising, a washing machine and a fluid-operable device associated with the machine for carrying out a washing operation, a fluid pressure supply line for the fluid-operable device, a fluid-operable valve in the supply line having a chamber in which pressure is generated to open the valve, means to close the valve when pressure in the chamber is released, automatically-operable venting means for releasing the pressure in the chamber at a certain rate, a tracker bar having an opening, a pipe connecting the opening with the chamber, a tracker sheet movable across the bar and having a group of spaced openings consecutively registerable with said tracker bar opening, the size and spacing of the openings being such as to obtain continuous pressure action in the chamber, the caliber of the vent in relation to the spacing of the tracker sheet openings being such that a venting rate sufficient to annul operating pressure in the chamber cannot occur during the interval between registrations of consecutive tracker sheet openings with the tracker opening, and means for delivering pressure fluid for entry through the registered openings.

20. A device of the class described comprising, a washing receptacle to be charged with flowable substance, a supply source of a substance the flow of which is to be controlled, means connecting said source with said receptacle, means for controlling flow through said connecting means to said receptacle, a tracker bar having an opening, means for creating suction through said opening, a fluid suction connection between said opening and said controlling means adapted when suction is created to draw air through said bar opening and operate said controlling means to obtain fluid flow through said connecting means, a tracker sheet movable against the bar, and means for moving the sheet at a predetermined rate, said sheet having openings adapted to register with opening of the bar to admit air through said bar opening, for a timed operation of said control means to control flow of said substance from said source to said receptacle.

HUBERT C. ELLIS.

REFERENCES CITED

The following references are of record in the file of this patent:

UNITED STATES PATENTS

| Number | Name | Date |
| --- | --- | --- |
| 825,277 | Rees | July 3, 1906 |
| 1,093,292 | Rieber | Apr. 14, 1914 |
| 1,337,367 | Otto | Apr. 20, 1920 |
| 1,633,487 | Maerten | June 21, 1927 |
| 1,678,276 | Sproull | July 24, 1928 |
| 1,752,631 | Campbell | Apr. 1, 1930 |
| 1,829,925 | Golod | Nov. 3, 1931 |
| 1,849,283 | Crane | Mar. 15, 1932 |
| 1,855,696 | Stover | Apr. 26, 1932 |
| 1,987,666 | Carlson | Jan. 15, 1935 |
| 2,025,097 | Dougherty | Dec. 24, 1935 |
| 2,056,833 | Davis | Oct. 6, 1936 |
| 2,198,860 | Carlson | Apr. 30, 1940 |
| 2,215,169 | Beeston | Sept. 17, 1940 |
| 2,294,371 | Andrews | Sept. 1, 1942 |
| 2,297,533 | Brotz | Sept. 29, 1942 |
| 2,302,529 | Cornell | Nov. 17, 1942 |
| 2,320,447 | Raymond | June 1, 1943 |
| 2,347,837 | Morrison | May 2, 1944 |
| 2,376,918 | Hughes | May 29, 1945 |
| 2,379,197 | Stubbins | June 26, 1945 |